(12) United States Patent
Beier

(10) Patent No.: US 12,201,931 B2
(45) Date of Patent: Jan. 21, 2025

(54) ORIFICE-DEFINING ENTRY PLATE WITH SUPPORT BRACE FOR FILTRATION DEVICE

(71) Applicant: Products Unlimited, Inc., Omaha, NE (US)

(72) Inventor: Scott B. Beier, Omaha, NE (US)

(73) Assignee: Products Unlimited, Inc., Omaha, NE (US)

( * ) Notice: Subject to any disclaimer, the term of this patent is extended or adjusted under 35 U.S.C. 154(b) by 557 days.

(21) Appl. No.: 17/149,247

(22) Filed: Jan. 14, 2021

(65) Prior Publication Data

US 2021/0205745 A1    Jul. 8, 2021

Related U.S. Application Data

(63) Continuation-in-part of application No. 16/471,044, filed as application No. PCT/US2019/012365 on Jan. 4, 2019, now Pat. No. 11,986,761.
(Continued)

(51) Int. Cl.
*B01D 46/00*    (2022.01)
*B01D 46/42*    (2006.01)

(52) U.S. Cl.
CPC ..... *B01D 46/0008* (2013.01); *B01D 46/0016* (2013.01); *B01D 46/0043* (2013.01); *B01D 46/4281* (2013.01); *B01D 2265/06* (2013.01)

(58) Field of Classification Search
None
See application file for complete search history.

(56) References Cited

U.S. PATENT DOCUMENTS

| | | | |
|---|---|---|---|
| 2,630,878 A * | 3/1953 | Hopper | B01D 46/00 |
| | | | 131/210 |
| 3,026,967 A * | 3/1962 | Stevens | F24F 13/28 |
| | | | 211/181.1 |

(Continued)

FOREIGN PATENT DOCUMENTS

| | | |
|---|---|---|
| CH | 511049 A | 8/1971 |
| CN | 101664625 A | 3/2010 |

(Continued)

OTHER PUBLICATIONS

Extended European Search Report for European Application No. 19763583.2 dated Oct. 13, 2021.
(Continued)

*Primary Examiner* — Brit E. Anbacht
(74) *Attorney, Agent, or Firm* — Kevin E. West; Advent, LLP

(57) ABSTRACT

A filter unit for use with a filtrating fluid flow system is configured to receive a flow of a fluid containing particulate matter. The filter unit comprises a filter structure formed of a filter material configured to at least partially filter the particulate matter from the flow of fluid. The filter unit further comprises an entry plate located proximate the filter structure entrance. The filter structure and the entry plate together define a fluid cavity within the filter unit, the entry plate having at least one orifice defined therein through which the flow of fluid can pass into the fluid cavity. The orifice is configured to form a choke, creating a Venturi effect for temporarily increasing the velocity of the flow of fluid through the entry plate and within the fluid cavity, and onto the filter material.

20 Claims, 36 Drawing Sheets

Related U.S. Application Data

(60) Provisional application No. 62/639,729, filed on Mar. 7, 2018, provisional application No. 62/960,972, filed on Jan. 14, 2020.

(56) References Cited

U.S. PATENT DOCUMENTS

| | | | |
|---|---|---|---|
| 3,309,848 A * | 3/1967 | Schwab | B01D 46/02 55/497 |
| 3,422,602 A * | 1/1969 | Janson | B01D 46/02 55/DIG. 12 |
| 3,443,366 A * | 5/1969 | Schwab | B01D 46/02 55/378 |
| 3,568,412 A * | 3/1971 | Schwab | B01D 46/02 91/1 |
| 3,951,627 A | 4/1976 | Barr, Jr. et al. | |
| 4,300,927 A * | 11/1981 | Day | B01D 46/02 55/483 |
| 4,639,260 A * | 1/1987 | Borow | B01D 46/4281 55/319 |
| 4,808,203 A * | 2/1989 | Sabourin | B01D 46/06 55/497 |
| 5,062,867 A * | 11/1991 | Klimczak | B01D 46/04 95/280 |
| 5,298,044 A * | 3/1994 | Sutton | B01D 46/023 55/497 |
| 5,308,485 A * | 5/1994 | Griffin | B01D 46/02 210/232 |
| 5,755,962 A | 5/1998 | Gershenson et al. | |
| 5,958,096 A * | 9/1999 | Yee | B01D 46/0002 55/517 |
| 6,358,139 B1 | 3/2002 | Renz | |
| 6,398,836 B1 | 6/2002 | Frankle | |
| 6,451,079 B1 | 9/2002 | Lange et al. | |
| RE39,473 E * | 1/2007 | Salo | A47L 9/127 15/352 |
| RE40,481 E | 9/2008 | Borla | |
| 8,720,028 B2 * | 5/2014 | Singh | B01D 46/58 210/232 |
| 8,764,871 B2 * | 7/2014 | Dralle | B01D 46/62 55/482 |
| 9,968,878 B2 * | 5/2018 | Walk | B01D 46/521 |
| 10,758,857 B2 * | 9/2020 | Walk | B05B 16/60 |
| 11,085,373 B2 * | 8/2021 | Dierksmeier | F02C 7/052 |
| 11,291,941 B2 * | 4/2022 | Walk | B01D 46/64 |
| 2003/0121238 A1 | 7/2003 | Richard | |
| 2004/0056123 A1 | 3/2004 | Douglas et al. | |
| 2004/0079231 A1 | 4/2004 | Green et al. | |
| 2004/0163370 A1 * | 8/2004 | Haufe | B01D 46/0005 55/483 |
| 2005/0039601 A1 | 2/2005 | Kosmider et al. | |
| 2005/0178265 A1 | 8/2005 | Altman et al. | |
| 2005/0178268 A1 | 8/2005 | Beier | |
| 2005/0218065 A1 | 10/2005 | Scott-Smith | |
| 2006/0075726 A1 | 4/2006 | Yoshimoto | |
| 2006/0288676 A1 | 12/2006 | Geyer, III | |
| 2007/0220844 A1 * | 9/2007 | Yamazaki | B01D 46/0005 55/341.6 |
| 2009/0049811 A1 * | 2/2009 | Choi | B01D 46/0001 156/70 |
| 2010/0132318 A1 * | 6/2010 | Igawa | B01D 46/06 55/379 |
| 2011/0252964 A1 | 10/2011 | Wahlquist et al. | |
| 2012/0240535 A1 | 9/2012 | Mann et al. | |
| 2013/0019578 A1 | 1/2013 | Dralle | |
| 2013/0174740 A1 | 7/2013 | Azzaretto et al. | |
| 2013/0305667 A1 | 11/2013 | Raether | |
| 2013/0318936 A1 | 12/2013 | Ball et al. | |
| 2013/0340618 A1 | 12/2013 | Kwok et al. | |
| 2015/0128540 A1 * | 5/2015 | Eyers | B01D 46/06 55/379 |
| 2015/0202560 A1 * | 7/2015 | Jarrier | B01D 46/023 55/378 |
| 2015/0298038 A1 | 10/2015 | Raether | |
| 2016/0166959 A1 | 6/2016 | Cui et al. | |
| 2016/0228800 A1 * | 8/2016 | Walk | B01D 46/2411 |
| 2017/0050136 A1 * | 2/2017 | Poon | B01D 46/0041 |
| 2017/0266600 A1 * | 9/2017 | Remschak | B01D 46/682 |
| 2018/0043293 A1 * | 2/2018 | Walk | B05B 16/60 |
| 2019/0070544 A1 * | 3/2019 | Sieh | B01D 46/0002 |
| 2019/0126185 A1 * | 5/2019 | Walk | B05B 16/60 |
| 2020/0197850 A1 * | 6/2020 | Walk | B01D 46/64 |
| 2021/0205745 A1 * | 7/2021 | Beier | B01D 46/0008 |

FOREIGN PATENT DOCUMENTS

| | | | | |
|---|---|---|---|---|
| CN | 203315947 U | | 12/2013 | |
| CN | 205730646 U | | 11/2016 | |
| CN | 111420491 B | * | 11/2021 | ......... B01D 46/0001 |
| DE | 3812790 A1 | | 10/1989 | |
| EP | 1273333 A1 | | 1/2003 | |
| EP | 2444752 A2 | | 4/2012 | |
| EP | 3762126 A4 | | 11/2021 | |
| FR | 2442653 A3 | | 6/1980 | |
| JP | 2008264595 A | | 11/2008 | |
| WO | 2014182988 A2 | | 11/2014 | |
| WO | 2015135488 A1 | | 9/2015 | |
| WO | 2017031316 A1 | | 2/2017 | |
| WO | 2017106644 A1 | | 6/2017 | |
| WO | 2019172988 A1 | | 9/2019 | |

OTHER PUBLICATIONS

Kang Ning, "Unlimited Primitive Energy: Wind Energy," Publication Date: Aug. 31, 2015, pp. 236-237.

Lin Zhaoxin, "Air Pollution Control Project," Publication Date: May 31, 1991, p. 325.

Office Action for Chinese Application No. 201980016265.1, dated Nov. 2, 2021.

Wu Tao, "The Latest Revised Edition of the Work Manual for Construction Project Managers," (vol. II), Publication Date: Sep. 30, 1999, p. 2296.

Abstract, "Development of LLJP Series Filter type Low Pressure Pulse Bag Filter", May 2013.

Office Action for Chinese Application No. 201980016265.1, dated Apr. 21, 2022.

Zhang and Yuan, "Numerical Simulation Study on Internal Flow Field of Bag Filters", Journal of Chinese Society of Power Engineering, Jul. 2010, pp. 518-522, vol. 30 No. 7, China.

PCT International Search Report and Written Opinion for PCT/US2019/012365, dated Apr. 23, 2019.

Examination Report from AU Application No. 2019232572, dated Oct. 3, 2023.

Office Action from European Application No. 19763583.2, dated May 15, 2024.

Office Action for Canadian Application No. 3,093,062, dated Mar. 22, 2024.

Communication pursuant to Article 94(3) EPC in Europe for Application No. 19763583.2, dated Jul. 14, 2023.

* cited by examiner

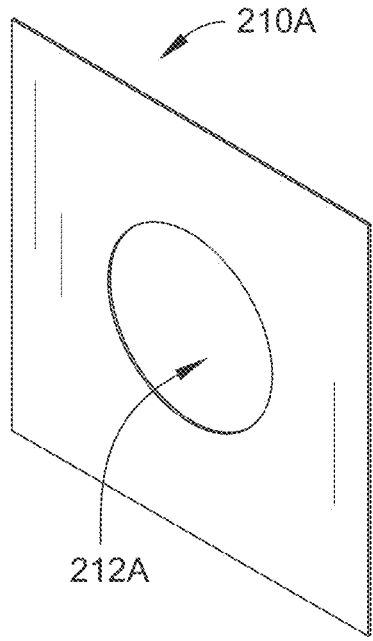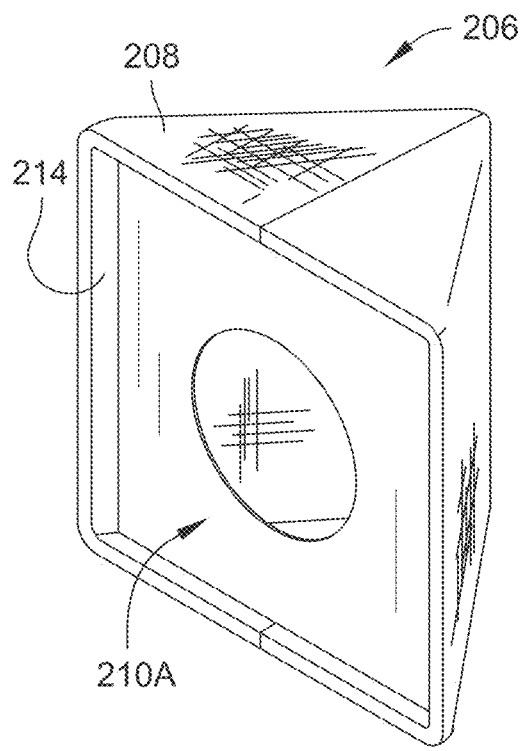
FIG. 2A    FIG. 2B
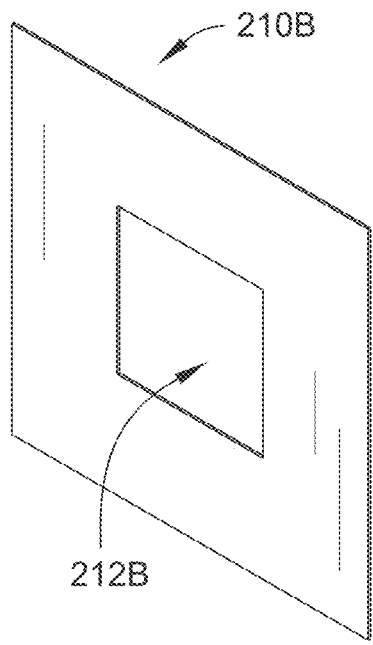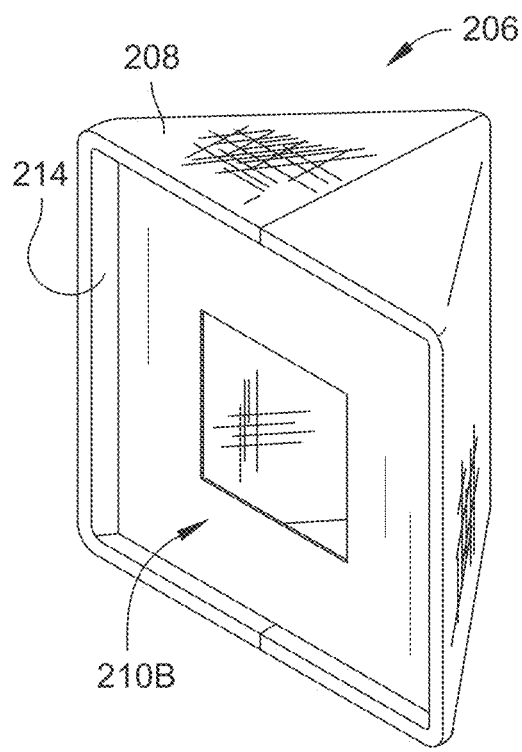
FIG. 3A    FIG. 3B

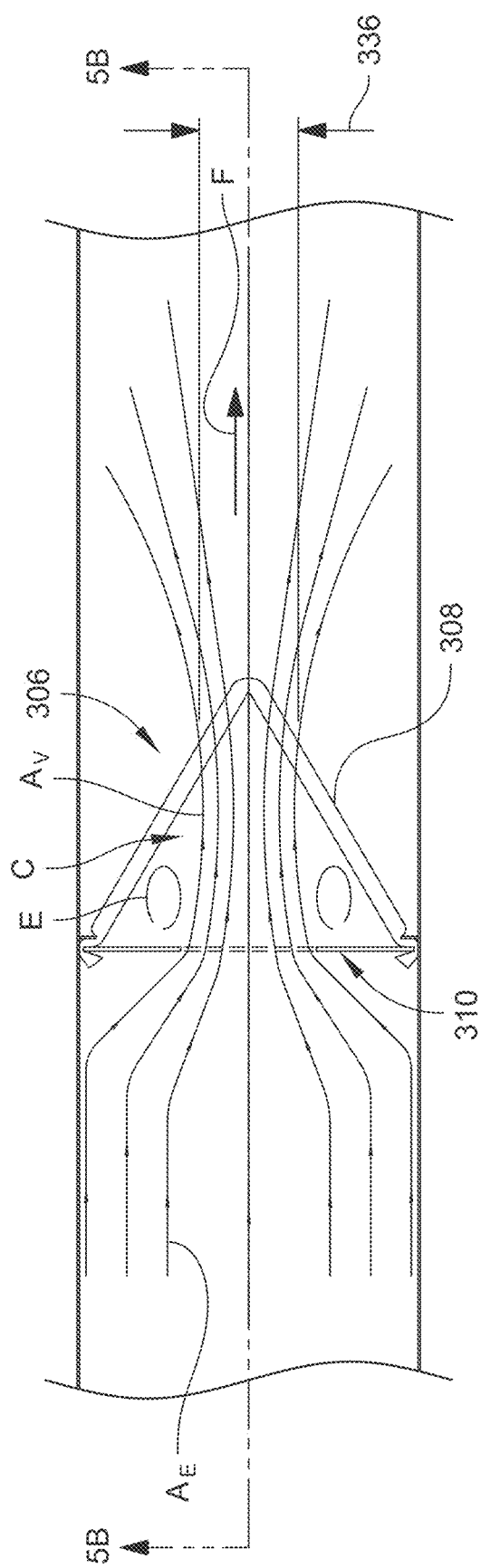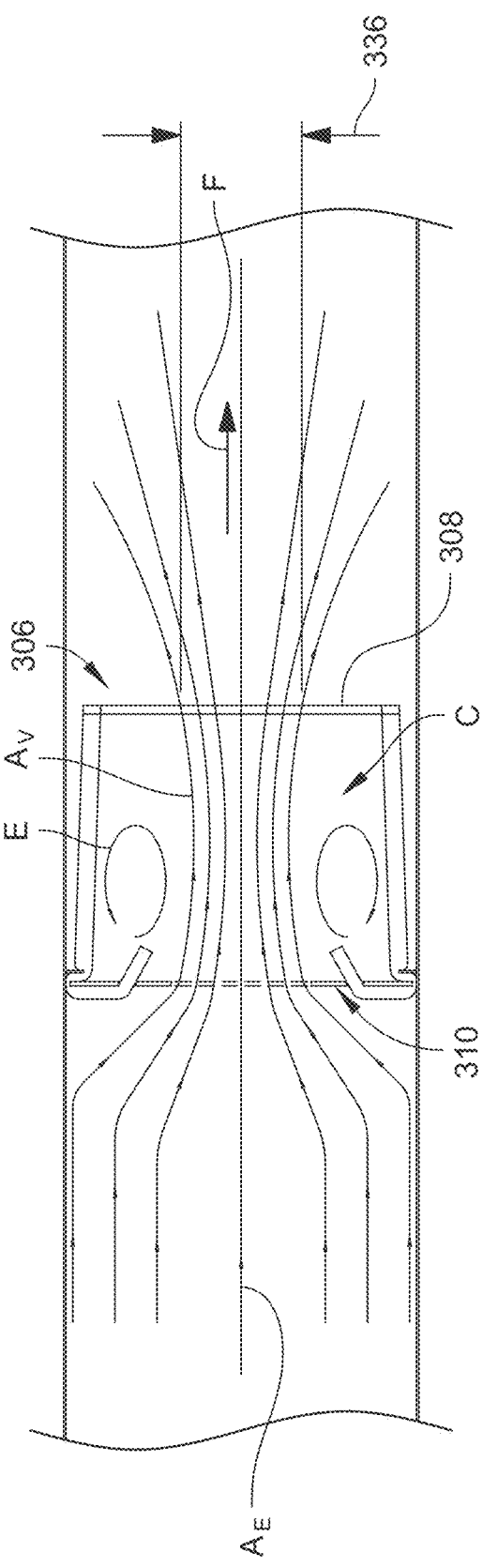

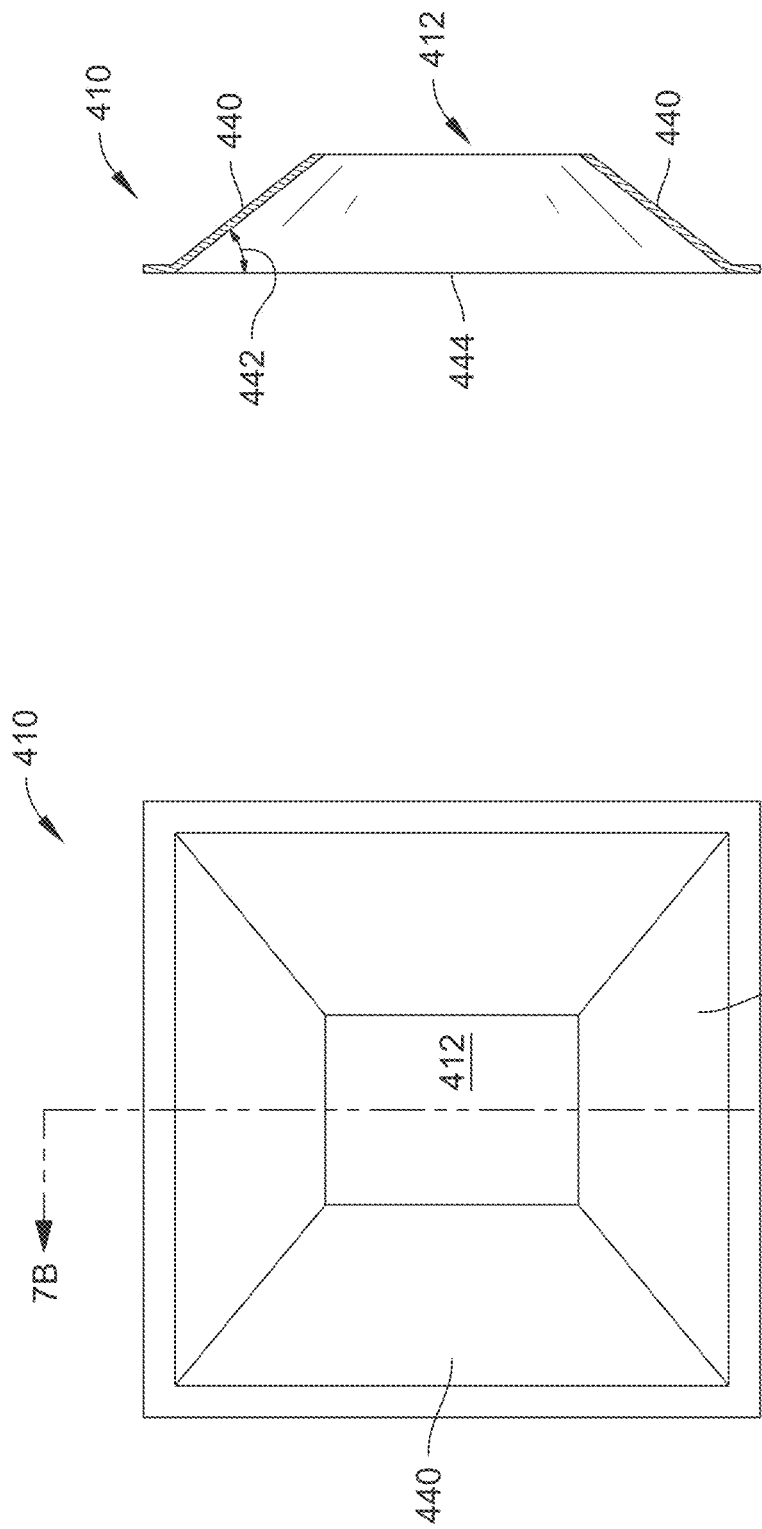

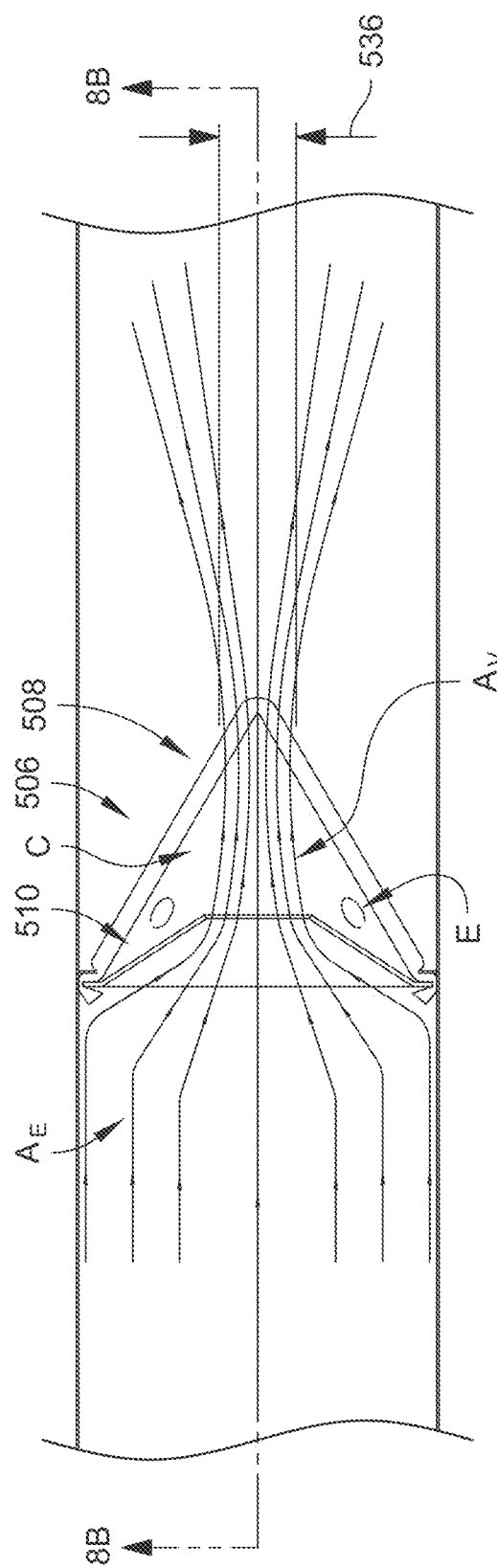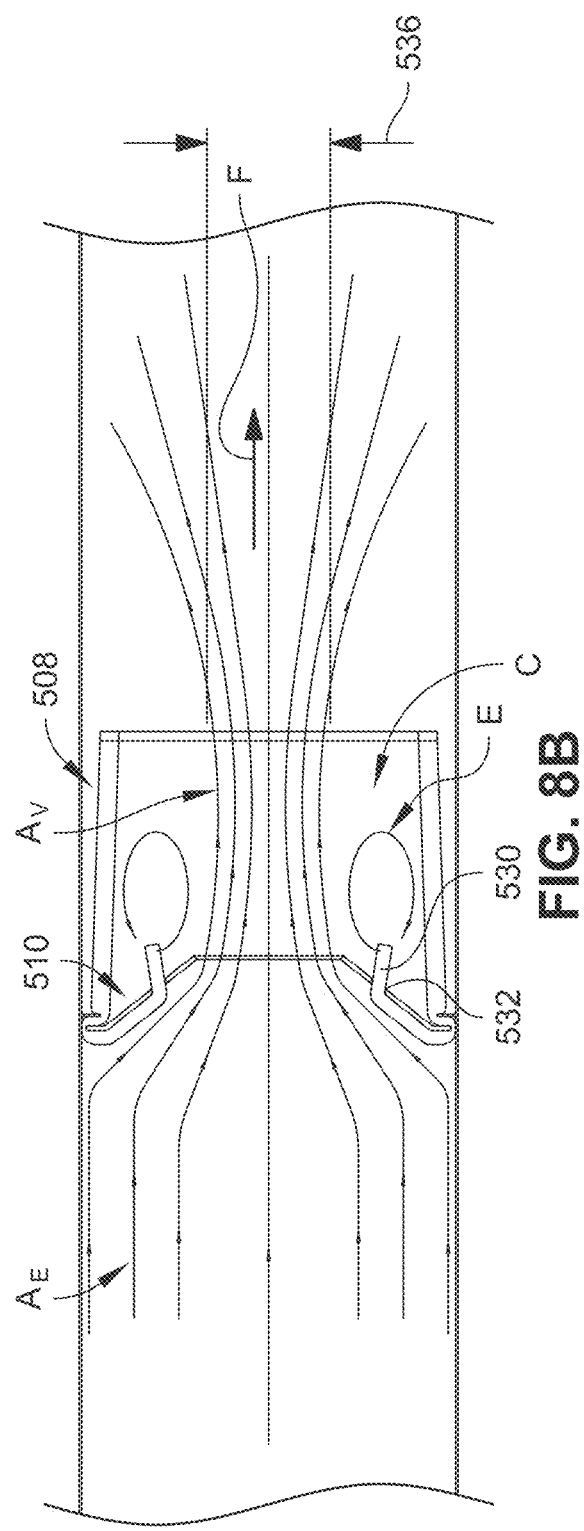

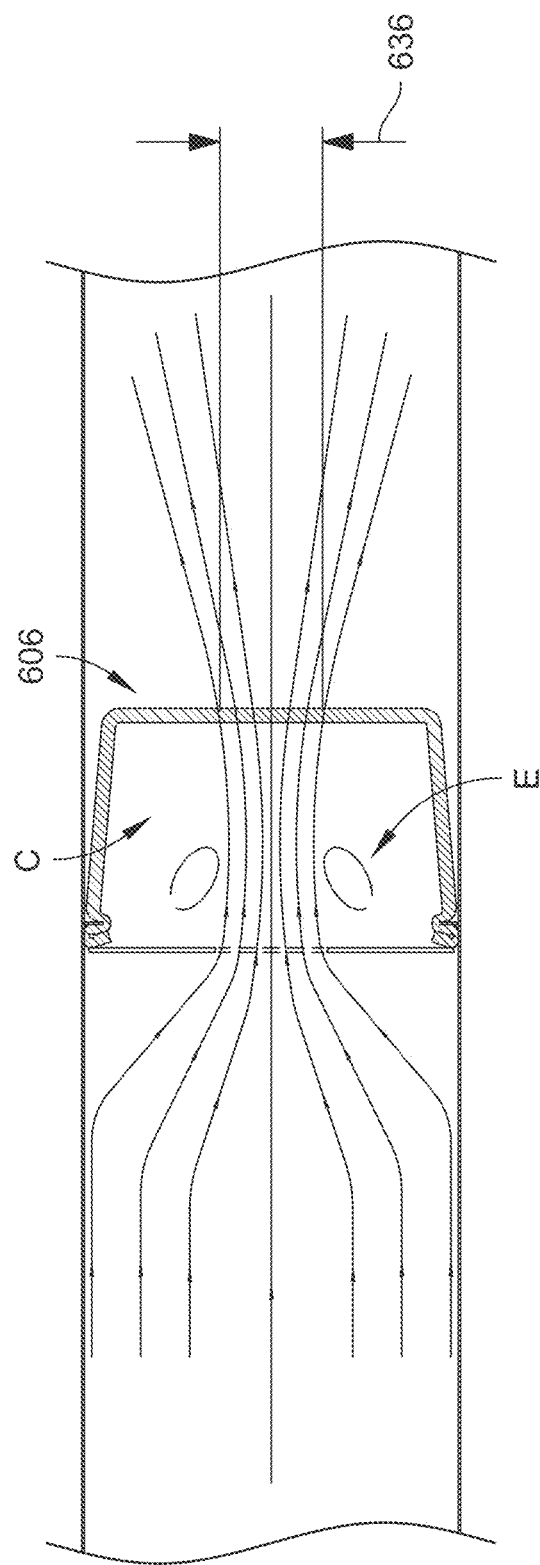

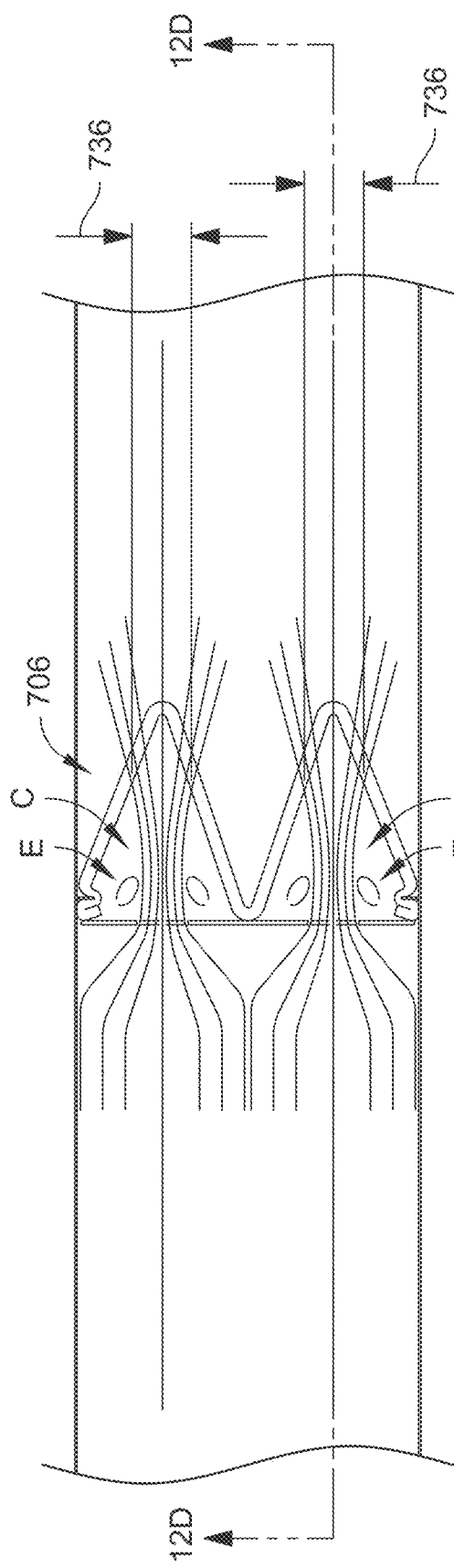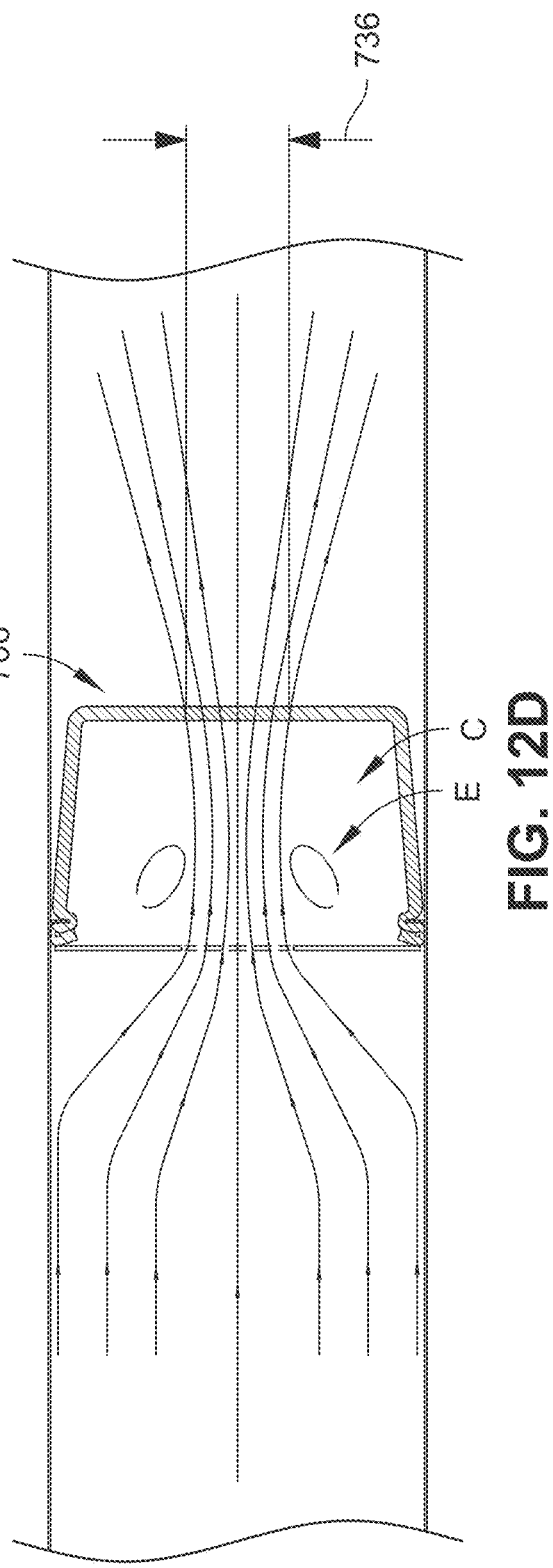

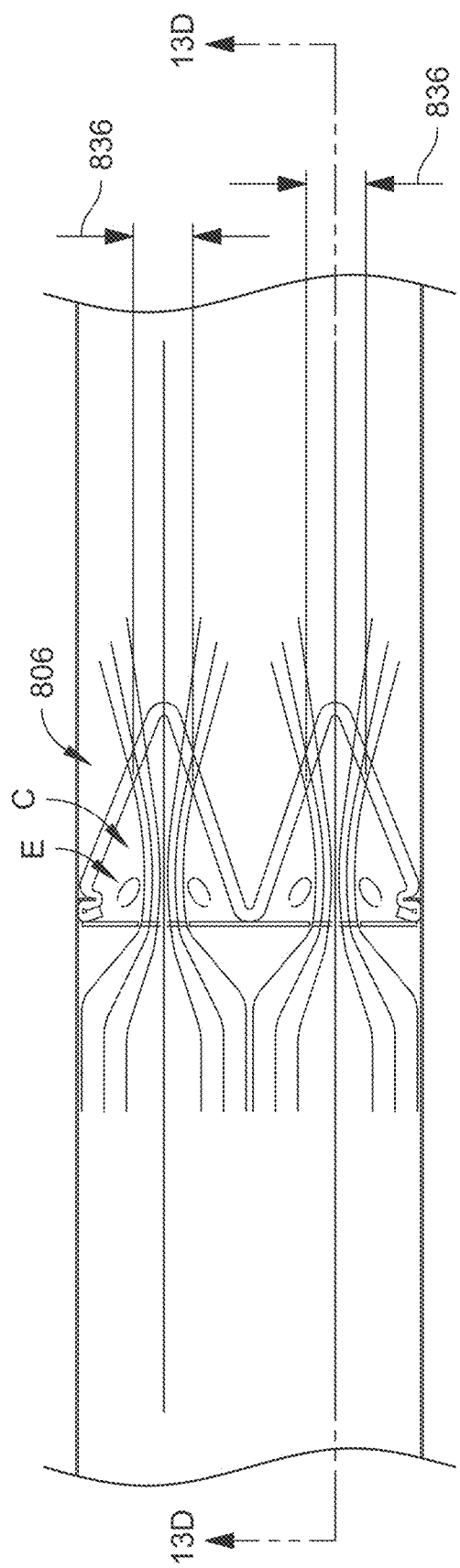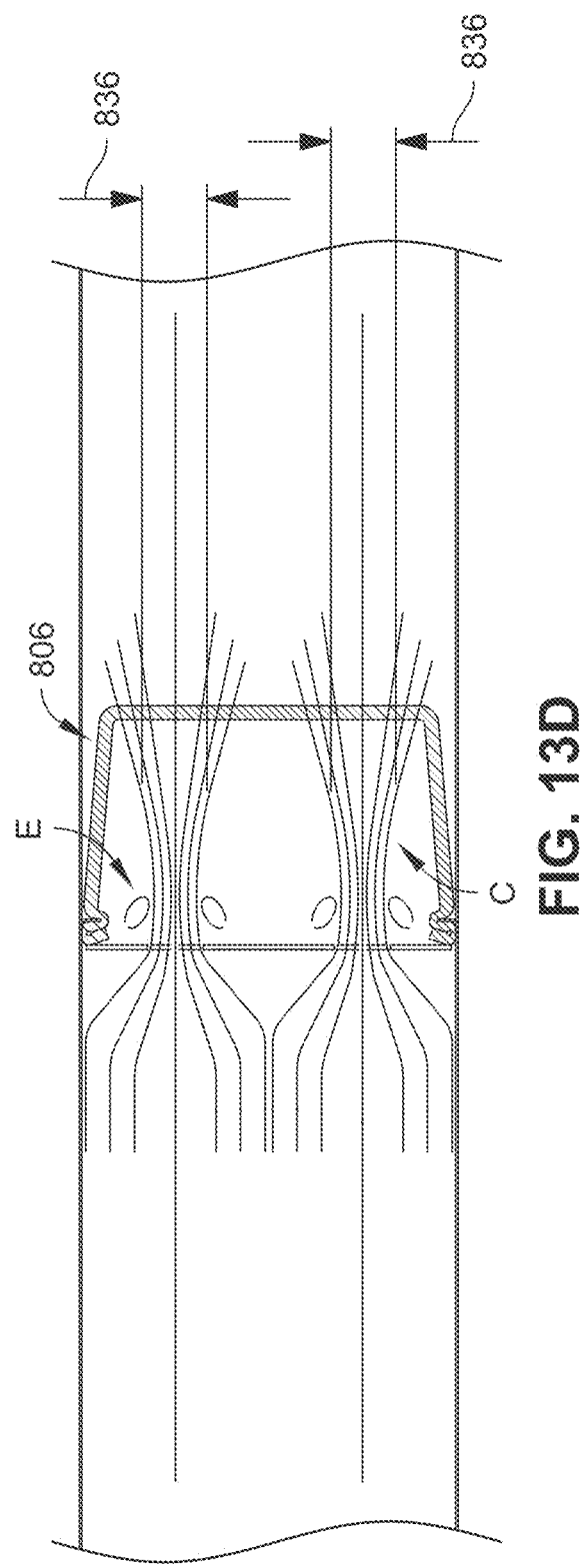
FIG. 13C
FIG. 13D

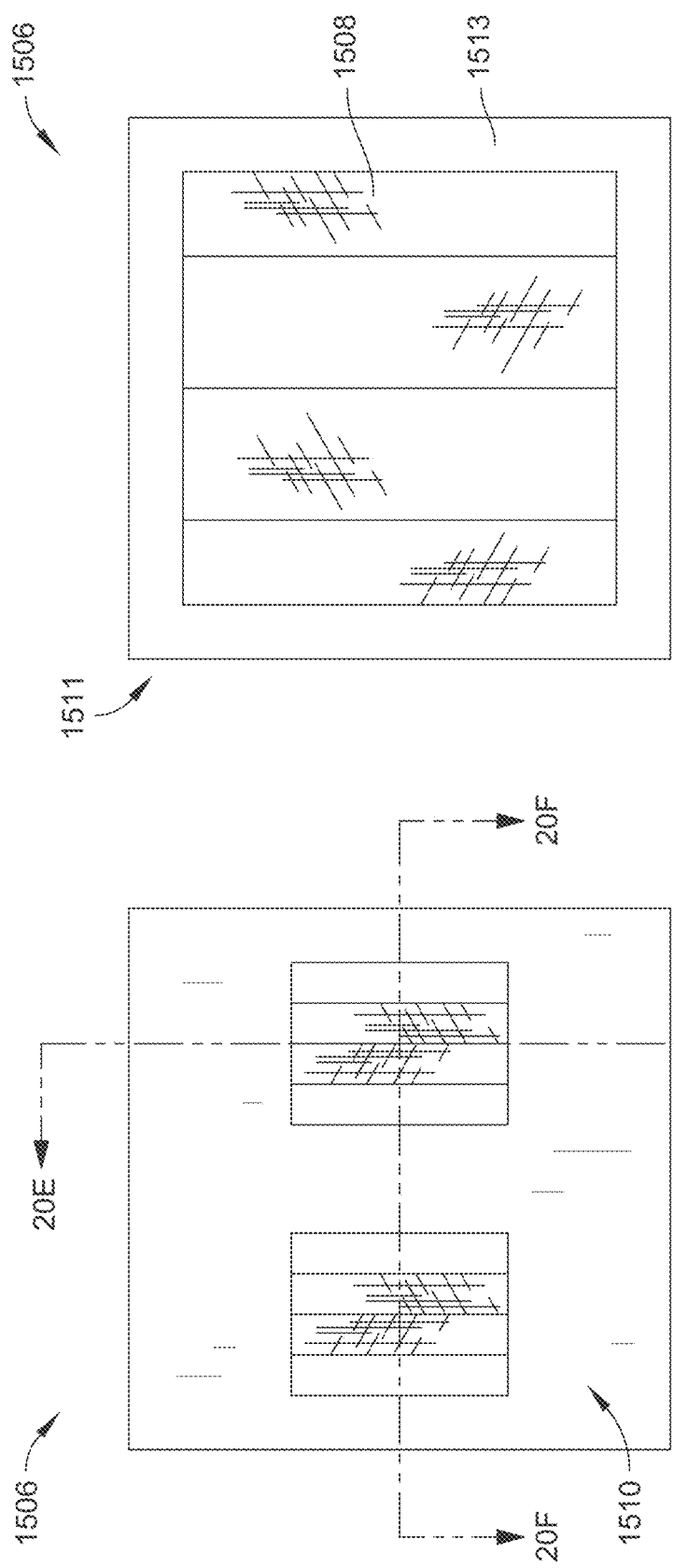

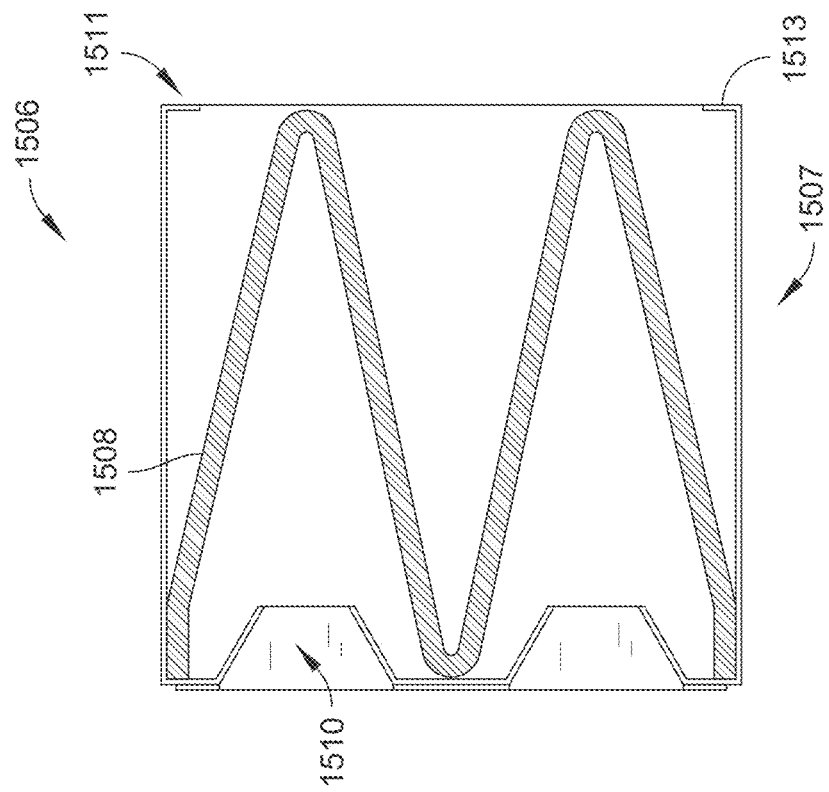
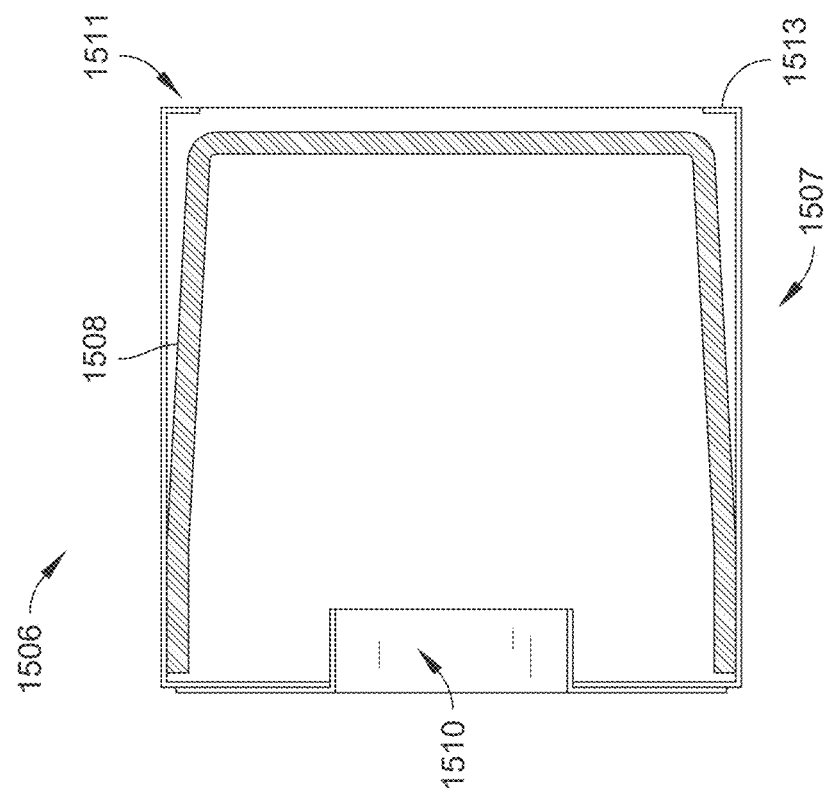
FIG. 20F
FIG. 20E

ORIFICE-DEFINING ENTRY PLATE WITH SUPPORT BRACE FOR FILTRATION DEVICE

RELATED APPLICATIONS

The present application is related to U.S. patent application Ser. No. 16/471,044, filed Jun. 19, 2019, entitled "ORIFICE-DEFINING ENTRY PLATE FOR FILTRATION DEVICE." U.S. patent application Ser. No. 16/471,044 is a U.S. national stage filing under 35 U.S.C. § 120 of International Application No. PCT/US2019/012365, filed Jan. 4, 2019, entitled "ORIFICE-DEFINING ENTRY PLATE FOR FILTRATION DEVICE." International Application No. PCT/US2019/012365 claims the benefit under 35 U.S.C. § 119(e) of U.S. Provisional Application Ser. No. 62/639,729, filed Mar. 7, 2018, entitled "ORIFICE-DEFINING ENTRY PLATE FOR FILTRATION DEVICE." The present application further claims the benefit under 35 U.S.C. § 119(e) of U.S. Provisional Application Ser. No. 62/960,972, filed Jan. 14, 2020, entitled "ORIFICE-DEFINING ENTRY PLATE FOR FILTRATION DEVICE." U.S. patent application Ser. No. 16/471,044, International Application No. PCT/US2019/012365, and U.S. Provisional Application Ser. Nos. 62/639,729, and 62/960,972 are hereby incorporated by reference in their respective entireties.

BACKGROUND

Filtration systems are utilized in industrial, commercial, and residential settings for the physical separation of components of a fluid stream from the fluid stream. The fluid stream may comprise gaseous or liquid carrier fluids in which components to be filtered are transported. Filtration systems may employ filter units to physically remove the components to be filtered (e.g., paint droplets, dust particles, etc.) via impingement, interception, diffusion, straining and the like.

DRAWINGS

Non-limiting and non-exhaustive embodiments of the present disclosure are described with reference to the following figures, wherein like reference numerals refer to like parts throughout the various views unless otherwise specified.

FIGS. 2A and 2B are isometric views, respectively, of a circular-orifice-defining entry plate and a filter unit incorporating that orifice-defining entry plate, in accordance with an example embodiment of the present disclosure.

FIGS. 3A and 3B are isometric views, respectively, of a square-orifice-defining entry plate and a filter unit incorporating that orifice-defining entry plate, in accordance with an example embodiment of the present disclosure.

FIGS. 5A and 5B are a cross-sectional view in a fluid stream and a cross-sectional view (taken along 5B-5B in FIG. 5A), respectively, of a filter unit incorporating a tab-and-slot connection mechanism, shown in use under a fluid flow, in accordance with an example embodiment of the present disclosure.

FIGS. 7A and 7B are a bottom view and a sectional view (taken along 7B-7B in FIG. 7A), respectively, of the entry plate with angled faces shown in FIGS. 6A and 6B.

FIGS. 8A and 8B are a cross-sectional view in a fluid stream and a cross-sectional view (taken along 8B-8B in FIG. 8A), respectively, of a filter unit incorporating an entry plate with angled faces, shown in use under a fluid flow, in accordance with an example embodiment of the present disclosure.

FIGS. 11A through 11C are a series of views (exploded isometric; assembled isometric; sectional view in a fluid stream) of a cubic-shaped pocket filter with a flat entry plate, in accordance with an example embodiment of the present disclosure.

FIGS. 12A through 12D are a series of views (exploded isometric; assembled isometric; cross-sectional view in a fluid stream; cross-sectional view along 12D-12D in FIG. 12C) of a "V"-shaped 2-pocket filter unit with a flat entry plate, in accordance with an example embodiment of the present disclosure.

FIGS. 13A through 13D are a series of views (exploded isometric; assembled isometric; sectional view in a fluid stream; sectional view along 13D-13D in FIG. 13C) of a "V"-shaped 2-pocket filter with a flat entry plate having two orifices per pocket, in accordance with an example embodiment of the present disclosure.

FIGS. 20A through 20F are a series of views (isometric with box top open; front, isosmetric with box top closed; front/inlet view; rear/exit view; cross-section along 20E-20E of FIG. 20C; cross-section along 20F-20F of FIG. 20C) of a two-filter system employing a box that defines a dual-nozzle plate (i.e., one per filter section) and a box exit.

DETAILED DESCRIPTION

Overview

Figure 1:
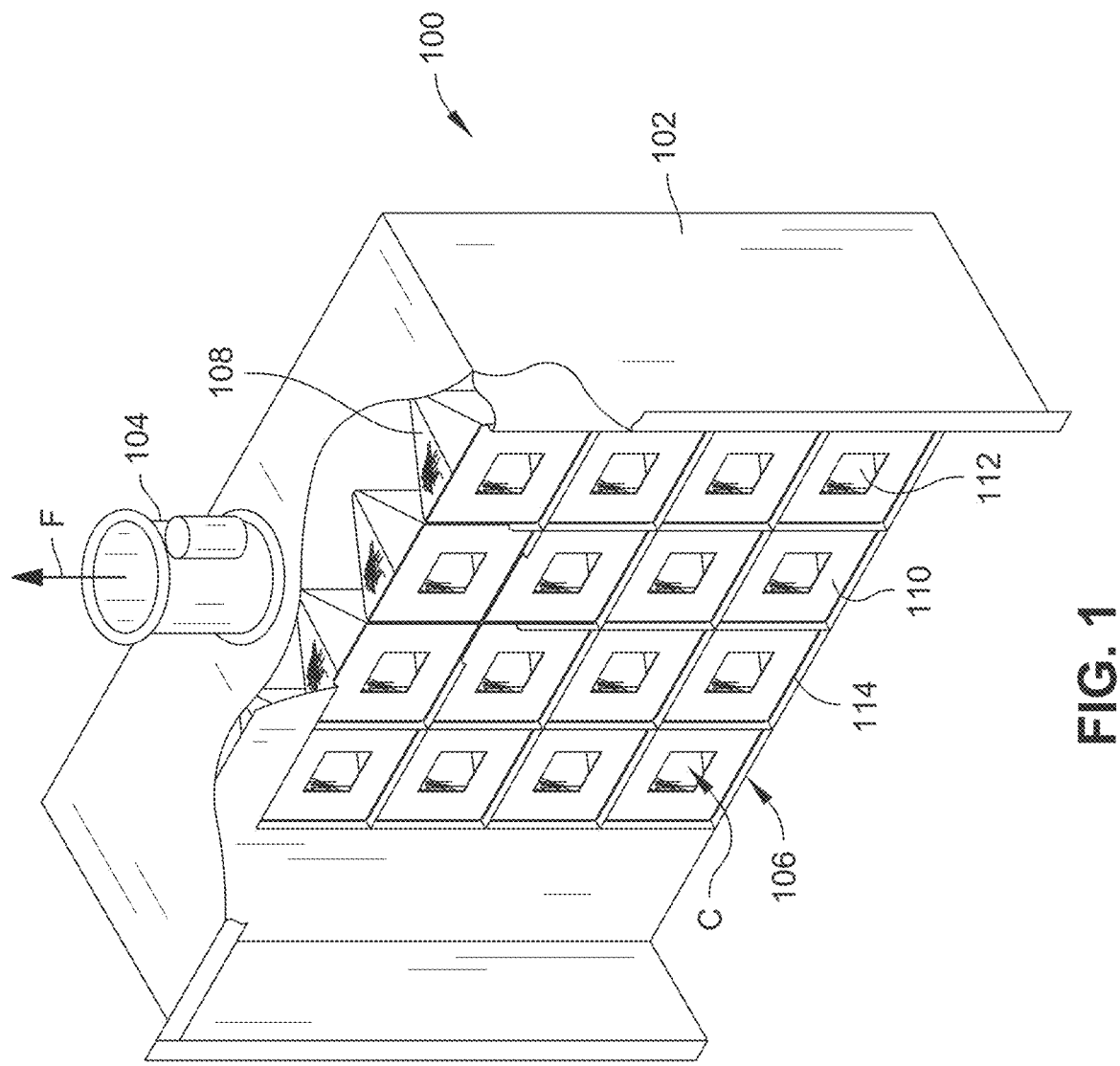
FIG. 1 is an isometric, partial cut-away view of a fluid flow system with a filtration system, similar to an industrial spray-painting booth, in accordance with an example embodiment of the present disclosure.

Filter units used in fluid flow system with a filtration system (i.e., filtrating fluid flow systems) have historically suffered from problems such as, for example, surface loading, high pressure drops, short lifespans, and/or complex attachment of a corresponding support frame. A filter unit's lifespan is determined by a given fluid handling (i.e. flow) system's designed capability to overcome the pressure drop through a filter unit. This pressure drop is continually increasing because of components in the fluid stream (e.g., particulates) that are captured in the filter unit. Therefore, a filter unit will need to be cleaned or replaced when the pressure drop across the filter unit has increased to the fluid handling system's design capability.

One existing filter unit, for example, consists of a flat, generally planar piece of filter media (i.e. filter pad) positioned in the fluid steam of a fluid handling system such that the fluid containing particulates must pass through the filter pad. Such a filter pad has a shorter lifespan due to its minimal amount of media that results in higher pressure drop and lower loading capacity. Another existing filter unit, commonly known as a pocket or cube filter unit, incorporates a fully open, three-dimensional filter media structure (i.e., filter structure) and a structural frame member, commonly made from metal, that is sewn or otherwise permanently attached to the filter structure proximate the opening of the filter structure, with the structural frame member being used to maintain an open filter arrangement.

Without the structural frame member present the open filter arrangement may close or collapse, and the filter unit can thus fail to operate properly or as intended. Such a three-dimensional filter unit, as compared to a filter pad of the same media, has more of the same media and therefore lower pressure drop and higher loading capacity and thusly a longer lifespan. However, the incorporation of the structural frame in this arrangement is particularly production-intensive and thus costly to manufacture. Moreover, such filters units, held in an open state by permanently attached structural frames, are larger and more voluminous and thus costly to warehouse and to transport from a manufacturing location to a consumer location. Furthermore, filter units incorporating metal frames cannot readily use incineration as a disposal method.

The present disclosure is directed to a filter unit that in various embodiments is less expensive to manufacture because the structural frame is not permanently attached to the filter structure, is less expensive to warehouse and to transport because the filter structure is less voluminous when in a closed or collapsed configuration, can utilize incineration as a disposal method because materials such as cardboard and plastic, for example, instead of metal, can be used to provide the needed structural strength, and has a longer lifespan due to the Venturi effect created by an orifice(s) that results in increased fluid velocity, which improves the impingement mechanism of particulate filtration. Of the many mechanisms involved in the filtration of particulates from a fluid stream, impingement is most directly related to the velocity of the fluid stream, with a change in velocity directly changing the momentum of the particulates.

Momentum is the tendency of the particulates to travel in a straight line even if the fluid carrying the particulates changes direction. In a filter unit, the change in fluid flow direction occurs because the fluid is generally designed to flow around the structural materials (e.g., the individual fibers that make up a fibrous filter material) of a fluid permeable filter media. The momentum of the particulates increases the likelihood that the particulates can strike (i.e., impinge upon) the filter media structural materials and be captured (i.e. filtered). The captured particulates, however, can add restriction to the flow of fluid through the filter media, resulting in an undesirable increase in the pressure drop across the filter unit. Those same captured particulates become part of the filter media structure. This increase in the amount of occupied volume within the filter media structural materials improves the likelihood that additional particulates can be captured by the filter unit.

In some embodiments, the filter unit of the present disclosure includes a filter structure (e.g., formed of a fluid-permeable filter material, such as a batting, foam, fibrous structure, or combinations thereof (or the like) and an orifice-defining plate member (e.g., an entry plate or a wall of a filter-carrying box) located proximate the fluid flow entrance or opening of the filter structure, with the plate member and the filter structure together defining a three-dimensional fluid cavity therebetween. The entry plate may, for example, be fabricated of a generally nonporous material, such as cardboard, plastic, sheet metal, or another structural, substantially non-permeable, material. In some embodiments, the entry plate is made of an inexpensive, generally nonporous material (e.g., cardboard, plastic, a recycled structural material, etc.) to facilitate replacement thereof, as needed. In some embodiments, the entirety of the filter unit (e.g., the filter structure, entry plate, etc.) is made of components that can be disposed of via incineration (thereby simplifying disposal). The entry plate defines at least one orifice therein (e.g., square, rectangular, polygonal, circular, oval, irregular, combinations thereof, and so forth). In embodiments, the orifice may be centrally located (e.g., latitudinally, longitudinally, or both). In embodiments, the orifice may be off-center.

The presence of the orifice in the entry plate functions as a choke, creating a Venturi effect, which temporarily accelerates (i.e., increases velocity of) the flow of fluid through the orifice, into the fluid cavity and, subsequently to the filter structure. In embodiments, the orifice may be configured to promote the formation of eddy currents within the fluid cavity at locations away from the orifice. In this manner, the presence of the orifice creates a low-pressure, fluid recirculating zone within the fluid cavity, wherein a portion of the particulates to be removed from the fluid may precipitate onto the downstream surface of the entry plate, thereby extending the lifespan of the filter unit.

In embodiments, the increased velocity flow of fluid may be particularly directed to impact on only a portion of the entire filter structure. In this manner, the enhanced impingement filtration mechanism resulting from the increased fluid velocity (e.g., increase in particulate momentum) deposits a greater portion of particulates on a smaller portion of the filter structure. Thusly, there are fewer particulates remaining to be filtered by the greater portion of the filter structure, resulting in a longer lifespan for the entire filter unit. That is, the non-particulate portion of the fluid flow can escape through the remaining portions of the filter structure not clogged by particulates. In embodiments, the portion of the filter structure impacted by the fluid stream (e.g., flow of fluid) may be generally in line with the corresponding orifice.

The entry plate may be a flat, generally planar member or may include one or more angled faces. In an embodiment including one or more angled faces, the entry plate can be configured such that, upon insertion at the opening of the filter structure, the one or more angled faces slope inwardly toward the orifice and into the interior of the filter cavity. As the presence of an orifice inherently increases the initial pressure drop (e.g. resistance to fluid flow) across the filter unit, the presence of the one or more angled faces creates a smooth approach to the orifice (particularly relative to a flat entry plate) and lessens the resultant increase in initial pressure drop. In an embodiment, the presence of the one or more angled faces can further direct fluid flow through the orifice of the entry plate onto a portion of the filter structure less than the entirety of the total filter structure. For example, the angled face(s) may be in the form of an open truncated cone (e.g., used in conjunction with a circular orifice), an open truncated pyramid (e.g., used in conjunction with a square or rectangular orifice), or a smooth approach bell-shape, which results in a reduced amount of increase to the initial pressure drop.

In embodiments, the entry plate (e.g., orifice plate) can be retained within the filter structure. In an embodiment, the entry plate may be retained by a press fit (e.g., material of the filter structure is displaced to a degree by the entry plate, thereby surrounding one or more edges of the entry plate) or otherwise interlocking fit within the filter structure. In some embodiments, the press fit may be enhanced by providing shaped edging to the entry plate (e.g., scalloped or serrated edging around the perimeter of the entry plate) to promote engagement of the entry plate with the filter structure. In some embodiments, the filter structure may include one or more tabs extending from the main filter structure, and the entry plate may define one or more corresponding plate slots through which a respective filter structure tab may be inserted, thereby helping to retain the entry plate relative to the filter structure.

In embodiments, the filter structure tabs can be formed of filter material that may have otherwise been considered waste material upon formation of the filter structure and otherwise trimmed from the main filter structure (i.e., tab/slot system permits better utilization of material). In some embodiments, one or more additional mechanical fasteners (e.g., one or more clips, one or more clamps, one or more threaded fasteners, a hook and loop fastening system, stitching, stapling, tape, adhesive, etc., or combinations thereof) and/or an adhesive may be used, whether alone or in combination with other mentioned mechanical retention mechanisms. In some embodiments, the entry plate may include a mechanism for incorporating an optional Z-dimension support for a non-self-supporting filter structure, and, in some embodiments, the non-self-supporting filtration device may be in the form of a material (e.g., a fabric) configured to be drape-able.

In embodiments the entry plate (e.g., orifice plate) may be a permanent portion of the filter unit. In an embodiment, an entry plate may have multiple orifices. In an embodiment having one or more orifices, one or more filter structures may correspond to one or more orifices. In an embodiment, a permanent entry plate may provide slots to correspond with filter structure tabs for retention of the filter structure to the entry plate. In some embodiments, one or more permanent additional mechanical fasteners (e.g., one or more clips, one or more clamps, one or more threaded fasteners, a hook and loop fastening system, etc., or combinations thereof) and/or an adhesive may be used, whether alone or in combination with other mentioned retention mechanisms. In some embodiments, the permanent entry plate may include a mechanism for incorporating an optional Z-dimension support for a non-self-supporting filter structure, and, in some embodiments, the non-self-supporting filtration device may be in the form of a material (e.g., a fabric) configured to be drape-able.

In an embodiment, to counteract potential sagging of a corresponding filter bag after an extended period of use, an operably removable brace can be integrated with a given entry plate to help keep a corresponding filter bag from sagging. In an embodiment, the brace can releasably attach (e.g., via tab/slot/notched connection; mechanical connectors (e.g., clips); adhesive; etc., or some combination thereof) to an entry plate (e.g., to the nozzle portion thereof) and can extend generally orthogonally to the entry plate. In an embodiment, the brace can extend rearwardly from the entry plate and supportively engage a corresponding filter bag (e.g., at an upper side (relative to gravitational direction) and/or at the apex thereof). In an embodiment, the brace can be made of cardboard, plastic, or another structural material capable of supporting and maintaining the desired shape and position of the corresponding filter bag. In an embodiment, the brace may be a thin (e.g., 0.25 in thick or less) plate support member. In an embodiment, the brace may be substantially rectangular, triangular, or I-shaped. In an embodiment, the brace and the apex of the corresponding filter bag may be oriented vertically relative to the ground or another ultimate support surface to minimize the opportunity for bending of the brace due to the effect of gravity (e.g., vertical pull on the bag as it becomes heavier during use). In an embodiment, the brace may include a cut-out or pre-formed opening therein (e.g., arc, parabola, etc.) at an edge thereof to facilitate attachment to a nozzle portion of an entry plate and/or to promote air flow proximate the nozzle exit.

Example Implementations

FIG. 1 illustrates an example embodiment of a filtrating fluid-flow system (e.g., an exhaust, ventilation, or other fluid flow system with a filtration system) 100, in accordance with the present disclosure. The filtrating fluid-flow system 100 may, for example, be an exhaust booth used in conjunction with an industrial paint spray operation. The filtrating fluid-flow system 100 can include an evacuation hood 102, an exhaust (e.g., ventilation or fluid flow) outlet 104, and a plurality of filter units 106. The evacuation hood 102 can carry (i.e., support) and/or include the exhaust outlet 104 and filter units 106, with the exhaust outlet 104 being configured to be connected to a vacuum flow ("F") (e.g., exhaust or ventilation flow). The vacuum flow F can promote movement of a fluid (e.g., a fluid flow, an airflow, an air-liquid mixture, etc.), including any liquid or solid particulates carried thereby, into the filter unit 106, with the filter unit 106 being configured to capture and retain liquid and/or solid particulates (e.g., paint, dust, etc.) from the fluid flow, as the fluid (e.g., air, etc.) is drawn through the filter unit 106 and toward the exhaust outlet 104. The vacuum flow F may be generated, for example, by an exhaust fan, blower, pump, etc. (not shown).

Each filter unit 106 as shown can define a pocket (e.g., open space) therein when held open. A filter unit 106 can act as a fluid flow filtration device and can generally include a filter structure 108 (e.g., made of a fluid-permeable filter material, such as a foam or a fibrous batting) and an entry plate 110 (e.g., made of a generally non-permeable material, such as cardboard or plastic), with the entry plate 110 defining at least one entry orifice 112 there though. In an embodiment, the filter structure 108 may be in the form of a fluid-permeable filter bag. The entry orifice 112 defines a choke through the entry plate 110 and can help promote a Venturi effect into the filter structure 108. The entry orifice 112 may also be considered to be a nozzle opening through the entry plate 110. In embodiments, the filter structure 108 can be an open-pocket filter. Further, in some embodiments, the filter structure 108 may employ a tab-and-slot connection with the entry plate 110, as discussed later. A given filter structure 108 may define a filter entrance (e.g., a throat or filter opening) 114 at a first end thereof, leading into the interior fluid cavity "C" (e.g., pocket volume) of the filter structure 108. In the embodiment shown, the filter structure 108 is illustrated to be in the form of an open triangular prism. This shape is beneficial in that it is very easy to construct. However, other shapes may be chosen for the filter structure 108, depending on the implementation.

The entry plate 110 (e.g., orifice plate) can be constructed of a non-permeable, structural material. As shown, the entry plate 110 can be interlocked or otherwise retained within or against or in general relationship to, a corresponding filter structure 108 proximate the filter entrance 114 thereof. The entry plate 110 can be releasably retained in place, for example, by a releasable molding, a quick-release adhesive, a press (e.g., interference) fit, or a mechanical connector (e.g., one or more clips, one or more clamps, one or more threaded fasteners, tape, releasable adhesive, a hook and loop fastening system, etc., or combinations thereof), or permanently retained in place, for example, by a permanent molding, a permanent adhesive, or a generally-permanent mechanical connection (e.g., stitching or stapling).

The entry plate 110 may accordingly serve to keep the filter entrance 114 open and retain the overall working shape of the corresponding filter structure 108 (e.g., by keeping the pocket structure open), which may otherwise be prone to collapse upon exposure to the vacuum flow F and/or to the collection of particulates within the filter structure 108. Thus, the entry plate 110 can help provide shape and/or structure to an otherwise substantially non-self-supporting filter structure 108. The entry plate 110, per the embodiment shown in FIG. 1, may be planar in shape. However, as will be described and shown hereinafter, the entry plate 110 may include one or more angled faces or may define additional structure (e.g., sides extending from the main planar portion; part of a box configuration). The entry plate 110 may further include reinforcing features (e.g., ribs; embedded elements) to promote the stiffness thereof. In the embodiment shown in FIG. 1, each filter structure 108 has a corresponding entry or orifice plate 110. However, as will be further described herein, it is contemplated that a single entry plate 110 may be provided with multiple orifices (e.g., for a plurality of filter structures; for multiple airflow passages to a given filter structure).

Figure 14A:
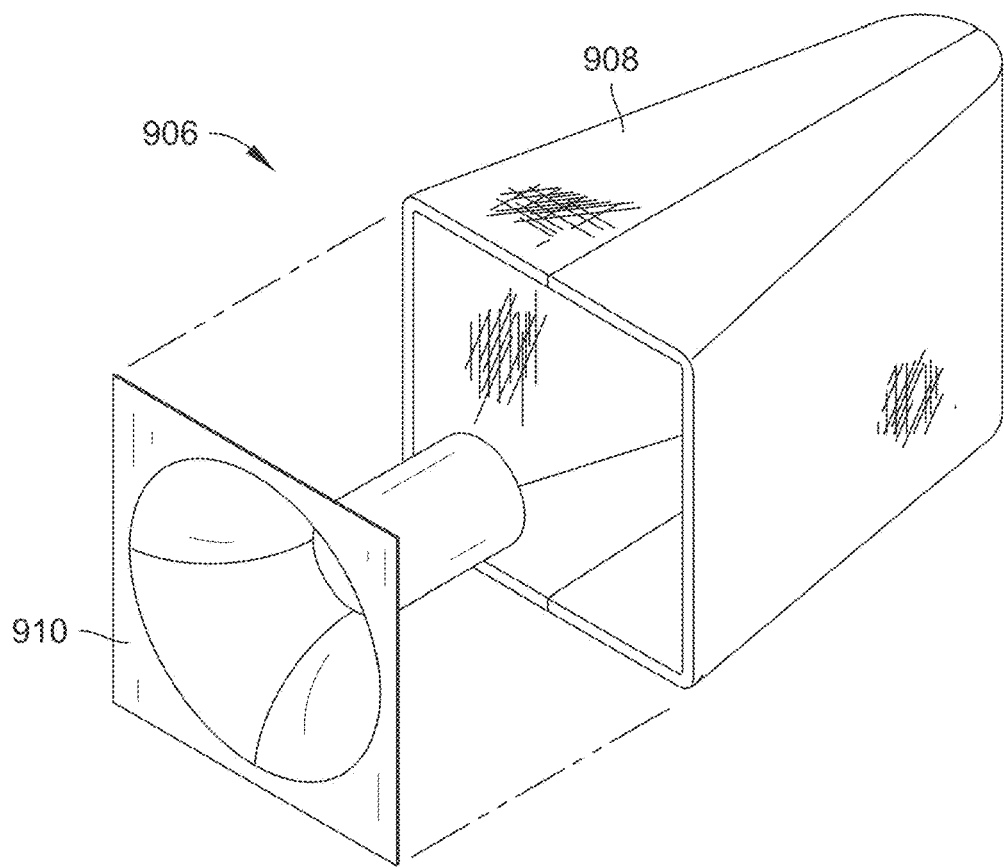
FIGS. 14A through 14D are a series of views (exploded isometric; assembled isometric; face view; and sectional view in a fluid stream along 14D-14D in FIG. 14C) of a filter unit with a bell-shaped entry plate, in accordance with an example embodiment of the present disclosure.
Figure 14B:
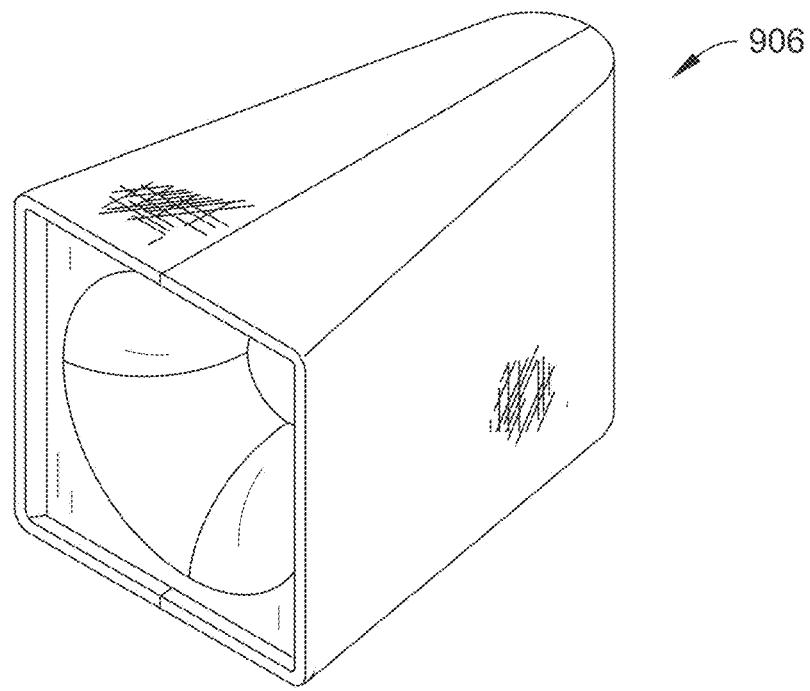
Figure 14C:
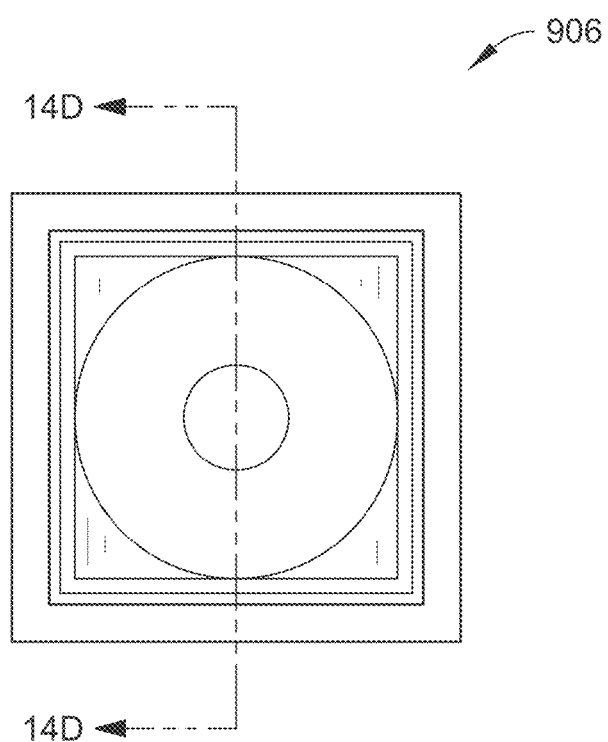
Figure 14D:
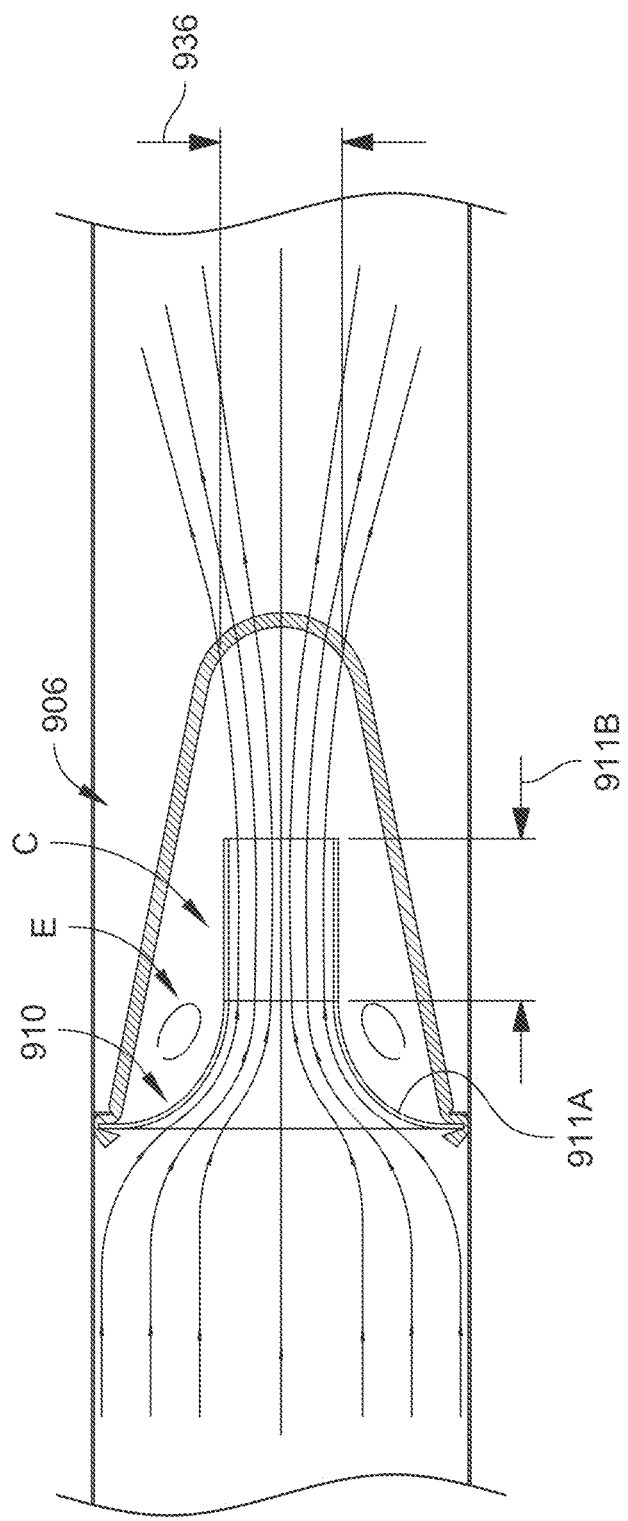

The filter structure 108 and the entry plate 110 together define a fluid cavity C (e.g., an open pocket) within the filter unit 106. In some embodiments, the fluid cavity C and the entry orifice 112 are configured such that the flow of fluid entering the fluid cavity C through the entry orifice 112 can be constricted and accelerated into an increased-velocity fluid stream. That is, the entry orifice 112 can serve as a choke through the entry plate (e.g., orifice plate) 110, resulting in a higher velocity fluid stream in the fluid cavity C and into the filter structure 108. In embodiments, the filter structure 108 may maintain the constriction of the fluid stream upon passing through the entry orifice 112, for example, by narrowing in cross-section relative to its depth (e.g., see FIGS. 5A, 11A). In some embodiments, the filter structure 108 may form an open triangular prism shape (e.g., FIGS. 5A, 5B), an open trapezoidal prism (e.g., truncated pyramid) shape (e.g., FIGS. 11A, 11B), or some other narrowing prismatic shape (e.g., FIG. 14A).

In some embodiments, the acceleration may be such that the increase in the velocity of the fluid flow from a position just upstream of the filter unit 106 to a position inside the filter unit 106, at which the flow is constricted to its minimum size (due to passing through a choke (e.g., constriction point)), may be 200% or more and can be in the range of 600 to 800%. In some embodiments, the fluid cavity C may be sufficiently large to permit the constricted flow to begin to re-expand within the fluid cavity C. In some embodiments, the fluid cavity C may be sufficiently large for low-pressure eddy currents E, as shown in FIGS. 5A and 5B, to develop outside the constricted flow $A_V$ (e.g., the constricted fluid flow $A_V$ resulting from a Venturi effect, per FIGS. 5A and 5B). In some embodiments, the fluid cavity C may be sufficiently small (e.g. the distance from the orifice 112 exit to the impact point on filter structure 108 (i.e., the depth of the fluid cavity C) and/or the available cross-section within the fluid cavity C) and/or may narrow in cross-section relative to the depth thereof (e.g., see FIG. 5A), so that the constricted flow stream cannot expand its velocity profile significantly within the fluid cavity C, thereby forcing a portion of the high velocity fluid stream (e.g., the constricted fluid flow $A_V$) to impinge directly on the material forming the filter structure 108. In embodiments, the impact velocity on the filter structure 108 is greater than a fluid-flow velocity prior to the flow passing through the entry orifice 112. In some embodiments, the flow of fluid (e.g. the constricted fluid flow $A_v$) can impact on only a portion of the total available filter structure 108 (e.g., a portion generally in line with the one or more entry orifices 112). In some embodiments, narrowing of the cross-section of the filter structure 108 can be used to help guide the flow of fluid to impact on a desired portion of the total available filter structure 108.

The entry plate 110 may, for example, be made of cardboard, plastic, wood, sheet metal, or any other material that is sufficiently non-permeable and/or nonporous to inhibit fluid flow through the entry plate material itself; and/or structurally rigid to provide, as needed, support to the filter structure 108. The entry plate 110 may substantially limit fluid flow into the filter structure 108 to the path offered by the at least one entry orifice 112 of the entry plate 110. The entry plate 110, in some embodiments, may be made of a recycled and/or biodegradable material. The entry plate 110 may be a disposable/replaceable item upon use thereof. In some embodiments, the entry plate 110 may be made of a material capable of being disposed of by incineration (e.g., at temperatures in the range of 540-1200° C.) at currently available solid waste incineration facilities. In some embodiments, the entirety of the filter unit 106 (e.g., the filter structure 108, entry plate 110, etc.) is made of components that can be disposed of via incineration (thereby simplifying disposal). In some embodiments, the entry or orifice plate 110 may be a permanent and/or reusable (e.g., cleanable) component of the filter unit 106. In some embodiments the entry plate 110 may be built into the filtrating fluid-flow system 100 or may be a permanent part of the evacuation hood 102. In some embodiments, the filter structure 108 may be reusable and/or cleanable, presuming the particulates filtered thereby can be adequately cleaned/removed therefrom to facilitate the reuse of the filter structure 108. In some embodiments, the filter structure 108 may be a disposable/replaceable item upon use thereof.

Various embodiments for the filter unit, the filter structure, and the related entry plate are contemplated by the present disclosure. These embodiments are considered interchangeable, for example, with the filter unit 106 and/or its individual components for use in the filtrating fluid-flow system 100, for example. As such, the filter unit and its related components are similarly numbered throughout, using a change in the first digit (e.g., 206, 306, 406) to denote the major embodiments. Similarly-numbered components can be expected to be similar in construction and material set forth with respect to the filter unit 106, unless expressly set forth with respect to a given embodiment.

FIGS. 2A through 3B illustrate examples of the filter unit 206. FIGS. 2B and 3B can each employ a filter structure 208 and a corresponding entry plate 210. In one variant, as shown in FIGS. 2A and 2B, the entry plate 210A can have a circular entry orifice 212A defined there through. In another variant, as shown in FIGS. 3A and 3B, the entry plate 210B can have a square entry orifice 212B defined therethrough. However, entry orifices 212 having other shapes, as described herein, are contemplated.

With this example filter unit 206, the entry plate 210A, 210B can be held within the filter entrance (e.g., filter throat) 214 of the filter structure 208, for example, by an interference (e.g., press) fit, an adhesive, tape, or one or more mechanical fasteners (e.g., one or more clips, one or more clamps, one or more threaded fasteners, a hook and loop fastening system, stitching, stapling, tape, adhesive, etc., or combinations thereof). The entry plates 210A, 210B can have an outer shape that generally matches that of the filter throat 214 to promote a close fit therebetween (e.g., minimizing airflow entering the filter unit 206 at the juncture of the outer portions of the entry plates 210A, 210B and the filter throat 214 (also commonly known as a "bypass"); and promoting an interference (e.g., press) fit therebetween). The entry plates 210A, 210B may, for example, have flat/straight outer edges (e.g., for simplicity of design and manufacture; matching of shape of filter throat 214).

FIGS. 4A through 4D illustrate various stages of assembly of an example filter unit 306. The filter unit 306 can include a filter structure 308 and an entry plate 310. The filter structure 308, in the illustrated embodiment, includes an opposing pair of tab extensions 330, while the entry plate 310 (e.g., orifice plate) defines a plate orifice 312 and a pair of slots 332, each on an opposed side of the plate orifice 312. As can be seen from FIGS. 4C and 4D, the tab extensions 330 can be folded and/or bent such that a portion thereof can be releasably retained within a corresponding plate slot 332 within the entry plate 310, thereby helping to retain the entry plate 310 in position within the filter structure 308. The tab-and-slot connection 333, along with a press fit between the outer boundary of the entry plate 310 and a filter throat 314 of the filter structure 308, can be sufficient to retain the entry plate 310 in place, potentially avoiding a need for any additional attachment mechanisms therebetween and allowing a user to readily switch out the filter structure 308 from the entry plate 310, as needed.

Figure 4B:
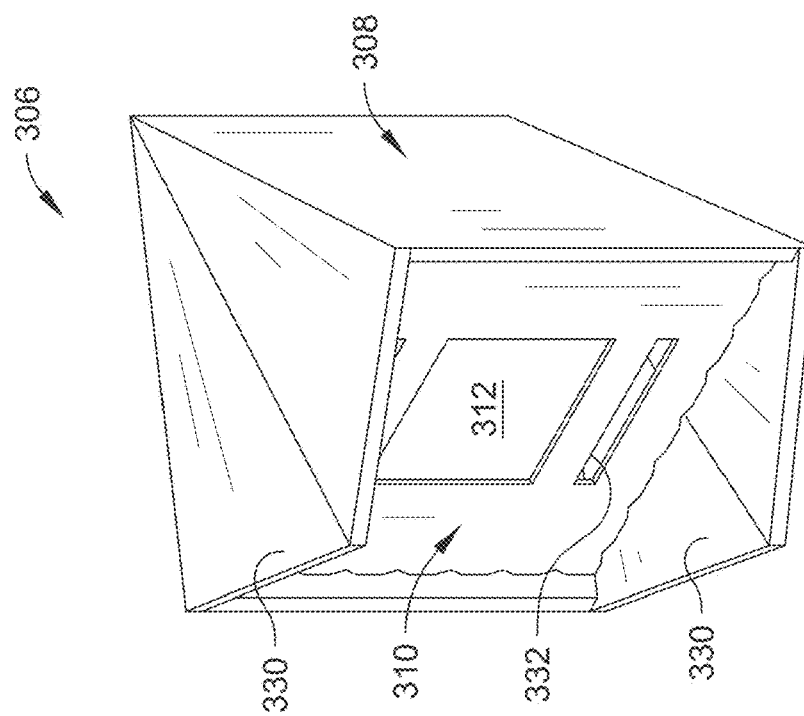
FIGS. 4A through 4D are a series of isometric views showing various states of assembly of a filter unit incorporating a tab-and-slot connection mechanism, in accordance with an example embodiment of the present disclosure.
Figure 4A:
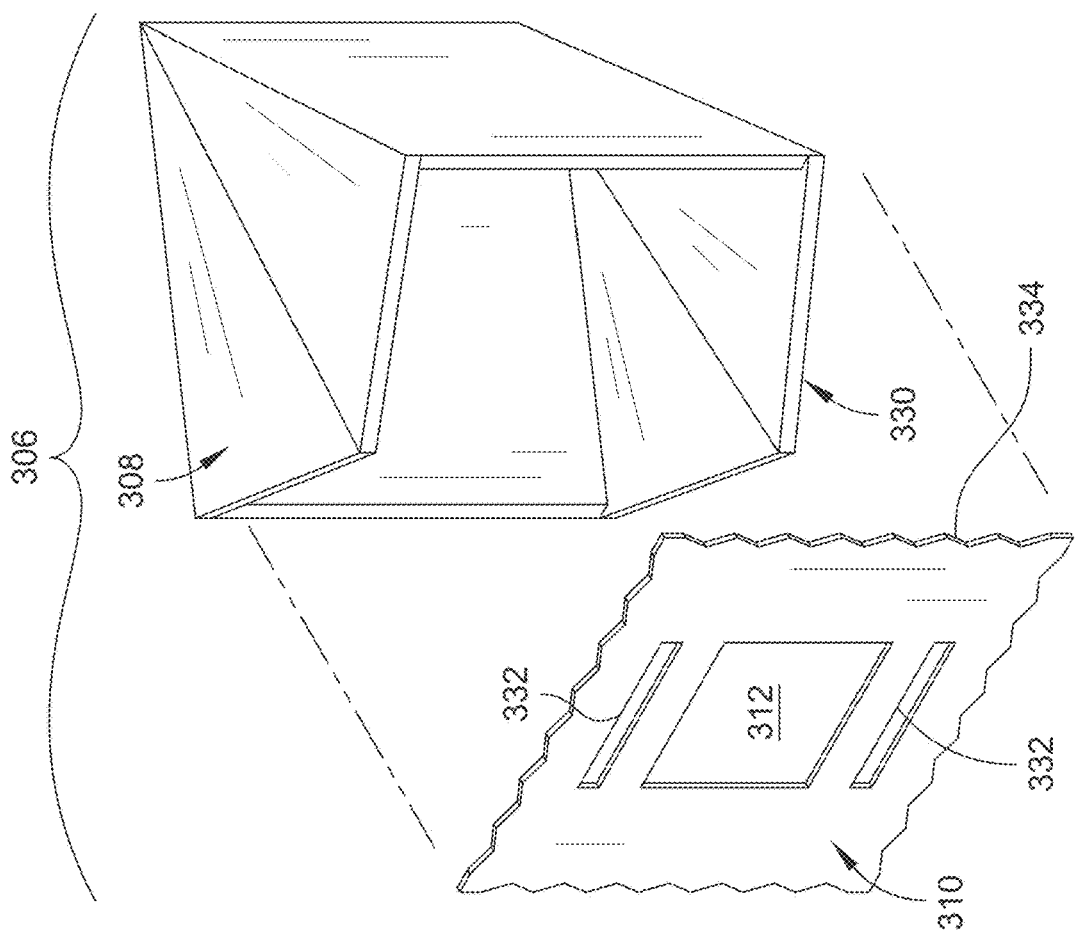
Figure 4D:
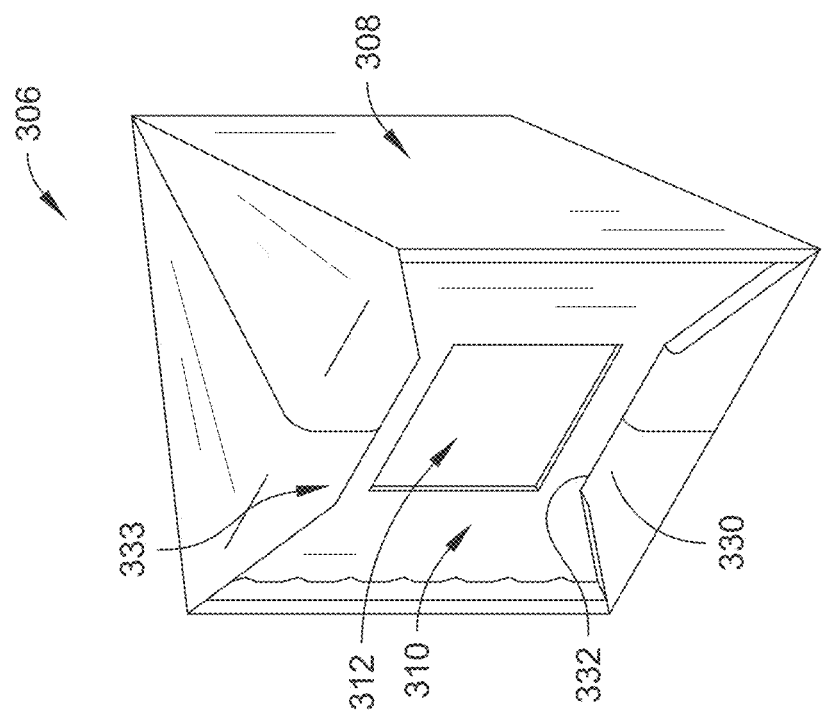
Figure 4C:
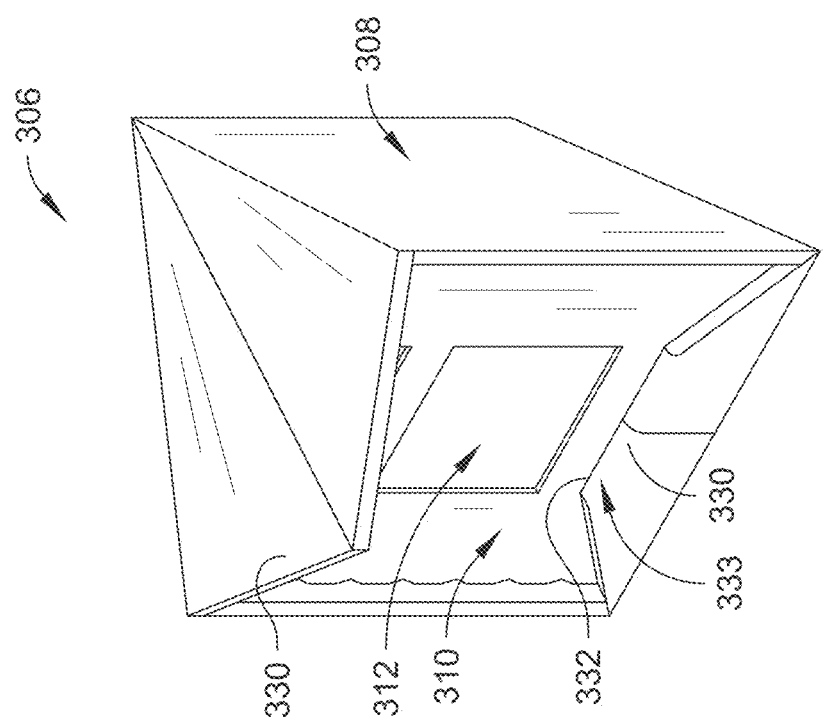
Figure 6A:
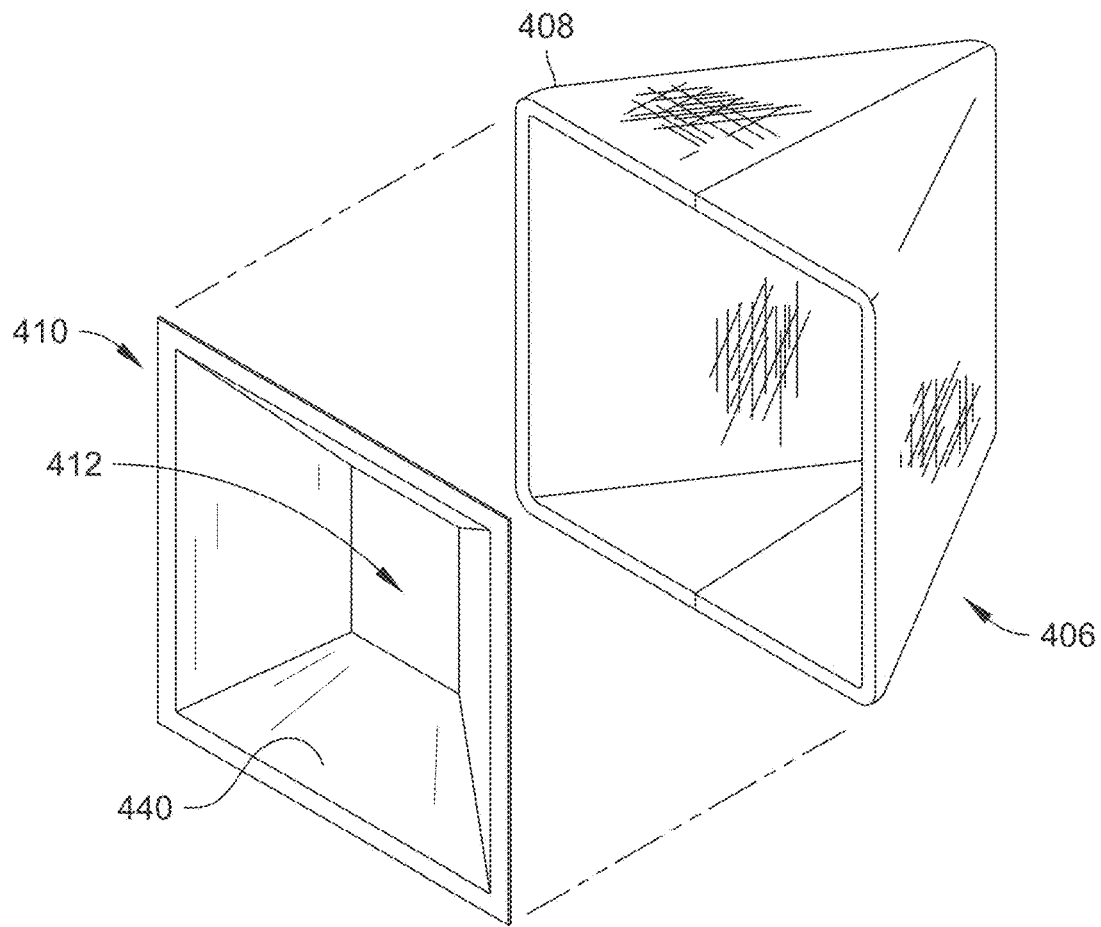
FIGS. 6A and 6B are exploded and assembled, isometric views, respectively of a filter unit incorporating an entry plate with angled faces and a filter structure in the form of a pocket, in accordance with an example embodiment of the present disclosure.
Figure 6B:
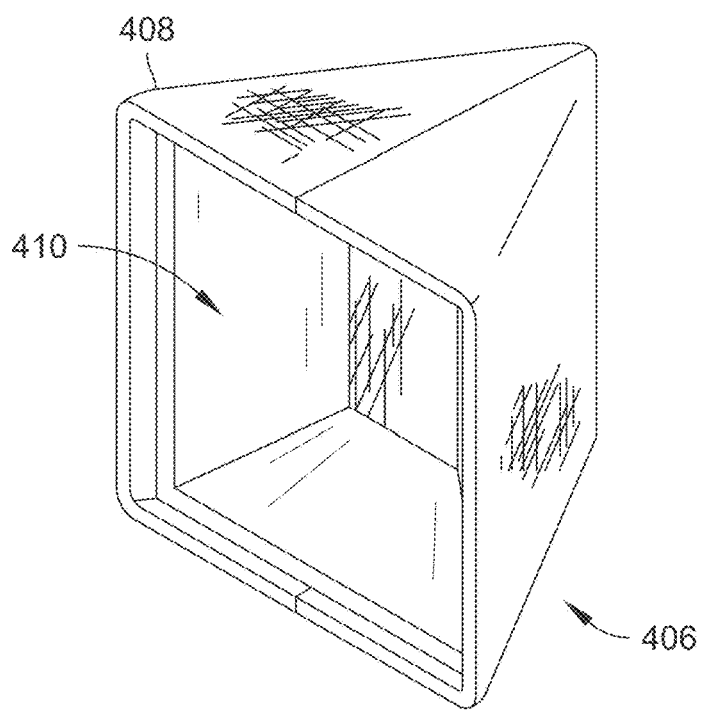

As shown in FIG. 4A, the entry plate 310, in some embodiments, may also include a scalloped or serrated outer edge 334. The scalloped or serrated outer edge 334 may be employed, as needed, to improve engagement with the corresponding filter throat 314. While shown with a scalloped, serrated, or wavy outer edge 334, it is to be understood that a flat edging or other similar edging may be employed and be within the scope of the present system. Likewise, it is to be understood that the use of a scalloped, serrated, wavy, or the like patterning for the outer edge 334 can be employed in other embodiments of the filter unit.

FIGS. 5A and 5B illustrate an example fluid flow (e.g., constricted upon entry through the flow choke point offered by the plate orifice 312) that may be provided when employing the filter unit 306, as well as the expected attachment (e.g., tab and slot; outer edging) arrangement associated with the filter unit 306. FIG. 5A is a cross-sectional view relative to the generally triangular (e.g., "V" shaped cross section relative to the filter opening) profile of an embodiment of the filter unit 306. Meanwhile, FIG. 5B is a cross-sectional view taken orthogonal (along 5B-5B in FIG. 5A) relative to the view used for FIG. 5A.

In an embodiment, a vacuum (e.g. lower pressure) is created (e.g. by a fan, blower, pump, etc., not shown) downstream of filter unit 306, causing fluid to flow through filter unit 306 in the direction generally indicated by arrow "F" (i.e., the flow direction). The construction of the filter structure 308 and the entry plate 310 of the filter unit 306 can produce, in general, at least four distinct fluid flow sections (as represented in FIGS. 5A and 5B): an external fluid flow $A_E$, having velocity $V_E$ and pressure $P_E$; a Venturi-effect constricted fluid flow $A_V$, having a velocity $V_V$ and pressure $P_V$; an eddy current section E, having pressure $P_{EC}$; and the downstream vacuum flow section F, having a velocity $V_F$ and pressure $P_F$ (e.g., the four sections defining the entirety of the filter unit 306 fluid flow zone). For simplicity, and the purpose of this example, the cross-sectional areas for fluid flow are the same for fluid flows $A_E$ and F. Therefore, the Law of Mass Conservation as applied to fluid mechanics states that the external fluid velocity, $V_E$, is generally equal to the vacuum fluid velocity, $V_F$, and that the velocity of the constricted flow, $V_C$, is higher than either $V_E$ or $V_F$.

Essentially, the choked flow created at the plate orifice 312 is able to induce an increase in velocity in the fluid flow and the particulates carried within this fluid flow. This increased velocity means greater momentum of the fluid stream. Momentum describes the tendency of mass (e.g., fluid/particulates) to continue moving in a straight line at the given velocity. Because of momentum, the fluid stream exiting the orifice cannot instantaneously change velocity and direction and tends, therefore, to continue, over a distance, as constricted fluid flow $A_V$ having pressure $P_V$. (It should be noted that, although not instantaneous and as represented by streamlines in FIGS. 5A and 5B, once constricted fluid flow $A_V$ exits the physical confines of plate orifice 312, fluid flow $A_V$ will begin to expand and slow and, given sufficient distance, transition completely into vacuum flow F having fluid velocity $V_F$, which is less than constricted velocity $V_V$).

The constriction of fluid flow $A_V$ further results in a lower pressure ($P_{EC}$) void in eddy current section E. $P_{EC}$ being lower than $P_V$ induces a portion of the particulate-carrying constricted fluid to draw away from the constricted fluid flow section, $A_V$, and circulate (i.e. swirl) within filter structure 308 as eddy currents E. The swirling eddy currents E may deposit, via impingement and/or precipitation, a portion of the carried particulates onto the downstream side (i.e., the interior or fluid-cavity side) of entry plate 310 without increasing the pressure drop across filter unit 306 thereby increasing the lifespan of filter unit 306. The constriction of fluid flow $A_V$ also consolidates the particulates within the fluid into the smaller flow area $A_V$. Furthermore, the increase in momentum can improve the impingement mechanism of particulate filtration, wherein particulates strike and are captured by the materials of a fluid-permeable filter media (e.g. the individual fibers that make up a fibrous filter material). The result is a more concentrated flow of particulates in a fluid stream being acted upon in a fluid filtrating system having an improved impingement filtration mechanism.

In an embodiment as shown in FIGS. 5A and 5B, filter structure 308 is able to intercept the constricted flow $A_V$ at impaction zone 336. The higher concentration of particulate capture created by constricting the fluid flow, in cooperation with the improved impingement mechanism resulting from the increased velocity/momentum in the constriction zone, deposits significant amounts of particulate in the impaction zone 336. The deposited particulate can cause the pores of the fluid permeable filter media (within the impaction zone 336) to ultimately close (i.e., clog). As these pores close, the constricted fluid flow tends to expand more abruptly, and the impaction zone can likewise enlarge. It is the designed presence of fluid cavity C that provides room for the impaction zone 336 to expand. As previously discussed, the constricted fluid flow has a higher velocity, and its carried particulates have greater momentum. Greater momentum increases the tendency of the particulate to continue in a straight line whereby a portion of these continuing particulates may impinge on the already closed portion of media in the original impaction zone instead of following the more abrupt direction change of the fluid. Therefore, an additional portion of the particulate is captured by impingement on this closed area leaving less particulate to effect closure of the remaining open pores. (That is, the non-particulate portion (e.g., air) of the fluid flow can escape through still-open pores within the filter structure 308.) As a result, the lifespan of filter unit 306 is further increased. It is to be understood that such fluid dynamics can generally be expected to exist in other present embodiments of the filter unit, not just in the filter unit 306.

FIGS. 6A through 7B together illustrate another example filter unit 406. The filter unit 406 employs a filter structure 408 and an entry plate 410. The entry plate 410 can include one or more angled faces 440 (e.g., acutely angled) that terminate at the plate orifice 412 of the entry plate 410 and slope inwardly into the interior (i.e., into the fluid cavity) of the filter structure 408. The one or more angled faces 440 can be considered to form a nozzle structure. The one or more angled faces 440 can help decrease the pressure drop across the entry plate 410 (due to a smoother and less turbulent transition of the fluid flow into and through the orifice 412) than may otherwise occur without the presence of the angled faces 440. Furthermore, the one or more angled faces 440 can provide a void upstream of the plate orifice 412 into which fluid (i.e., air) may enter, allowing for a Venturi effect at the plate orifice 412 to occur, even if the filter unit 406 is close to or even immediately adjacent the source location of the fluid flow to be filtered. Additionally, the use of the angled faces 440 effectively reduces the distance between the plate orifice 412 and the back (e.g., apex) of the filter structure 408 (i.e., the plate orifice 412 is in the interior of the filter structure 408, instead of at the filter throat or opening 414). Therefore, adding the angled faces 440 to reduce that distance between orifice 412 and impaction zone increases the probability that the high-velocity fluid stream $A_V$ can impact upon the filter structure 408 well before the constricted flow $A_V$ transitions into lower velocity vacuum flow F, even if a larger and/or deeper filter structure 408 is employed. In the illustrated embodiment, four angled faces 440 are employed and thereby defining a four-sided, truncated pyramid, leading to a square or rectangular-shaped plate orifice 412. However, it is to be understood that other quantities of angled faces 440 may be employed, leading to a relatedly shaped orifice. For example, one angled face 440, in the form of truncated cone, may be used to define a circular orifice (not shown). Alternatively, by way of example only, but not shown, five angled faces 440 may be used to create a truncated, pentagonal pyramid and defining a pentagonal orifice.

As previously stated, the one or more angled faces 440 can be angled at an acute angle 442, shown in FIG. 7B, (relative to an opening plane 444 extending across the entry plate 410 and opposite the plate orifice 412). The acute angle 442 can be greater than 0 degrees and less than 90 degrees, and in some embodiments, the acute angle 442 may be in a range of fifteen to sixty-five degrees (15-65°). In some embodiments, the acute angle 442 may be chosen to promote one or more of the above-discussed benefits associated with having one or more angled faces 440.

FIGS. 8A and 8B, in a manner similar to FIGS. 5A and 5B, illustrate an example filter unit 506 in use. The filter unit 506 is similar in construction to the filter unit 406, except that it employs a tab(s) 530 and slot(s) 532 connection system, as first shown in FIGS. 4A through 4D as tab(s) 330 and slot(s) 332. Thus, the filter structure 508 and the entry plate 510 are similar to the filter structure 408 and the entry plate 410, respectively, except for the aforementioned tab-and-slot connection system. Similar to FIGS. 5A and 5B, the filter unit 506 in use under the effect of a vacuum (e.g., exhaust) creates, in general, at least four distinct fluid flow sections: external fluid flow $A_E$, constricted fluid flow $A_V$ (e.g., fluid flow (e.g., air flow) displaying a Venturi effect), eddy current section E, and downstream vacuum flow section F. As can be seen by comparing FIGS. 8A and 8B to FIGS. 5A and 5B, the angled-faces of filter plate 510 move the plate orifice 512 to a location deeper into fluid cavity C and therefore closer to impaction zone 536 of filter structure 508.

The constricted fluid flow $A_V$ is essentially linear (due to its momentum), in the direction of arrow F, as it exits plate orifice 512 but is able to begin to gradually expand and slow and, given sufficient distance, can transition entirely into the vacuum flow F. As noted earlier, improvements in the impingement mechanism of filtration are achieved with higher velocities, suggesting a position of the plate orifice 512 very close to impaction zone 536 is generally desired. However, as also previously discussed, these same improvements in the impingement mechanism can promote the capture and retention of more particulates from the fluid stream, causing increased filter media pore closure and the subsequent degree of enlargement of the impaction zone 536. Greater distances from the plate orifice 512 exit to the impaction zone 536 provide for additional enlargement of the impaction zone 536. The choice of embodiment, either presented or anticipated, can depend on the variables associated with differing implementations. In all of the various embodiments where a fluid flow is discussed, it is to be understood that any fluid flow (e.g., air, paint or other liquid, liquid-solid mix, gas-liquid mix, gas-solid mix, etc.) may be similarly employed and be within the scope of the present system.

Figure 9:
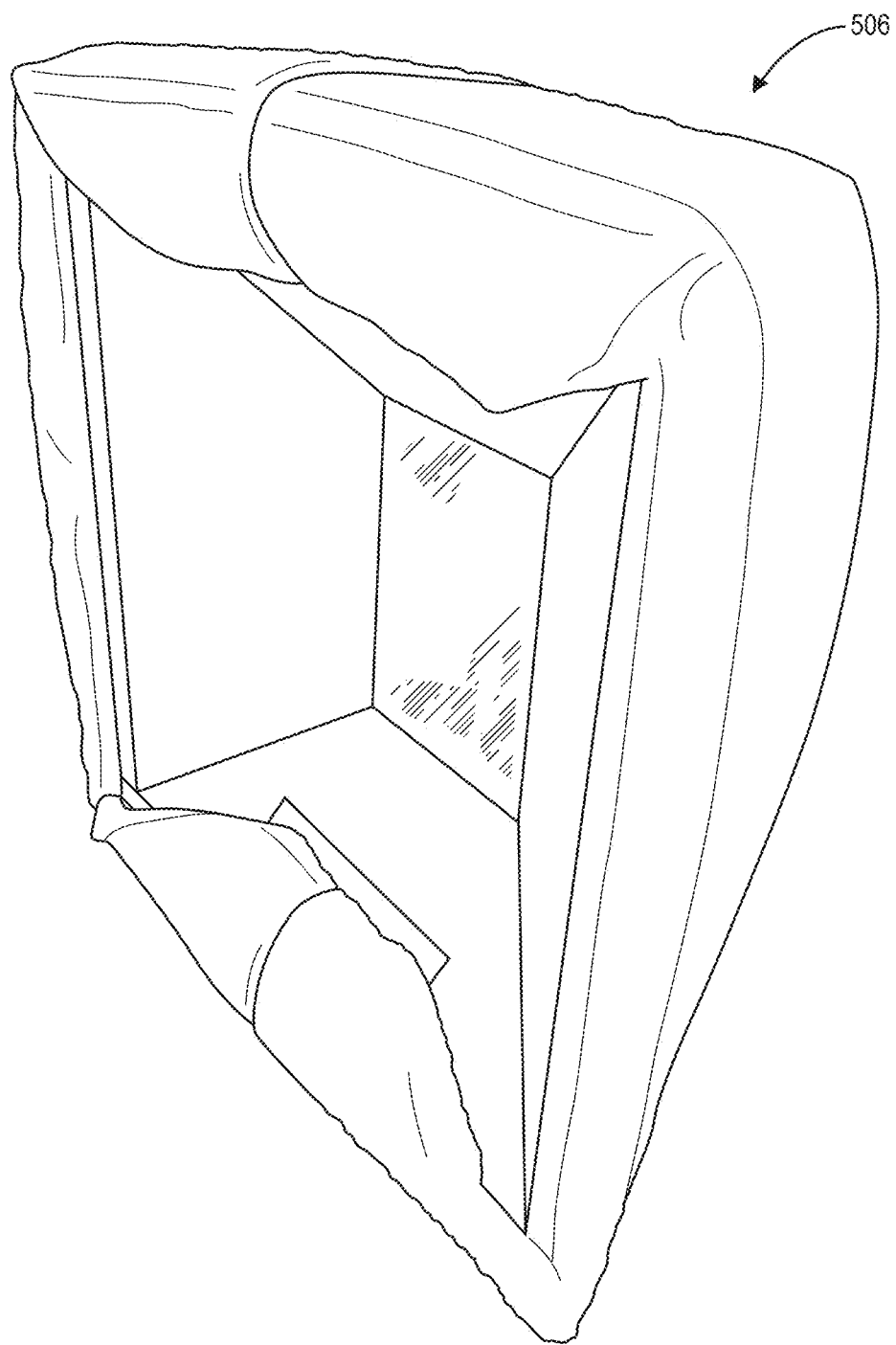
FIG. 9 is a view of a filter unit prototype that incorporates an entry plate with angled faces, in accordance with the embodiments shown in FIGS. 6A-8B.

FIG. 9 is side, isometric view of a prototype version of the filter unit 506.

Figure 10:
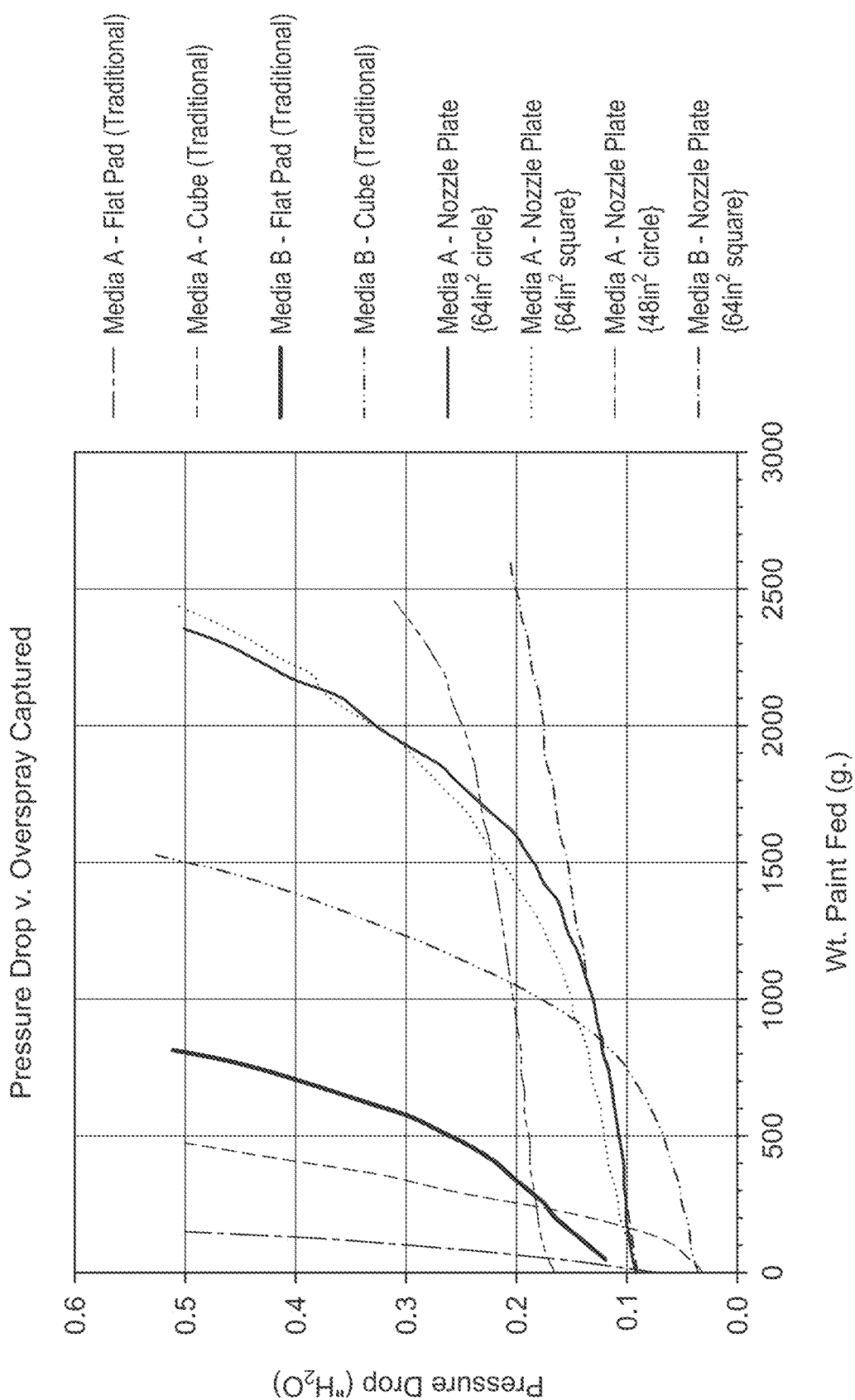
FIG. 10 is a series of graphs of pressure drop versus paint overspray particulate capture (relative to the weight of paint fed to an industrial spray gun) for a series of different filter units, both traditional and present versions.

FIG. 10 shows a series of graphs reflecting the pressure drop across a filter unit versus the amount of paint overspray particulate captured by that filter unit (relative to the weight of paint fed to an industrial spray gun) for a tested series of different filter units, both traditional ones and several of those of the present disclosure. All filter units of the present disclosure incorporated a flat entry plate arrangement (e.g., per the filter unit 106, 206, 306) and are described as having a "Nozzle Plate" per the included legend. Filter units, having two different filter media or material (one filter media per filter unit), were tested. Filter media A is a commodity-grade, high-loft, nonwoven polyester that has two-dimensional (i.e. generally planar) inlet and exit surfaces and is 1" thick, and Filter media B is Applicant's filter media which has a three-dimensional inlet surface and a two-dimensional exit surface. Furthermore, separate filter units of the present disclosure were tested having orifices of different shapes and different sizes. It is important to note that, per the test methodology employed, when the pressure drop across a filter unit reached 0.5 inches of water column, that filter unit was considered to have attained its usable limit (i.e. lifespan) and thus needed replacement, concluding the test of a given filter unit. This limit was chosen to reflect the design capability for a typical industrial paint booth-style fluid handling system. Accordingly, the more paint that can be sprayed (e.g., the resultant amount of overspray ultimately captured) before reaching that limit, the more effective a given filter unit is deemed to be. As it can be seen from FIG. 10, every filter unit of the present disclosure that was tested outperformed all traditional versions that were also tested.

Figure 11A:
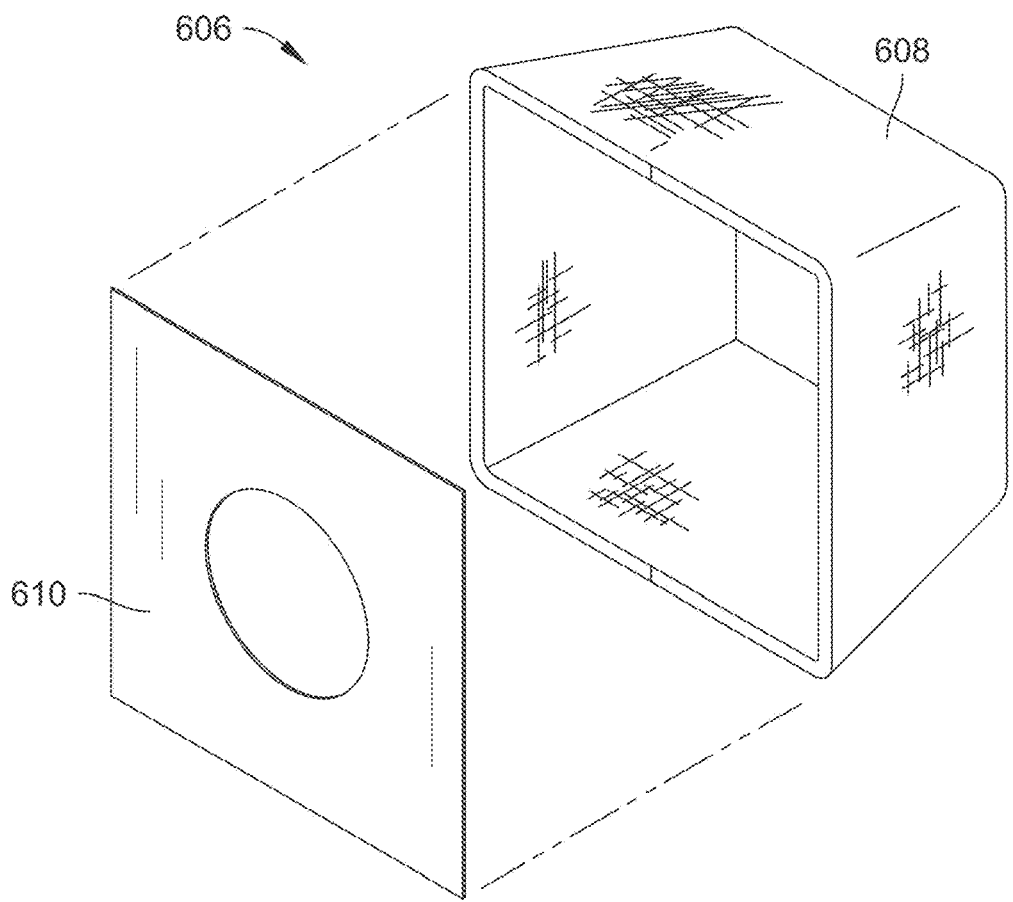
Figure 11B:
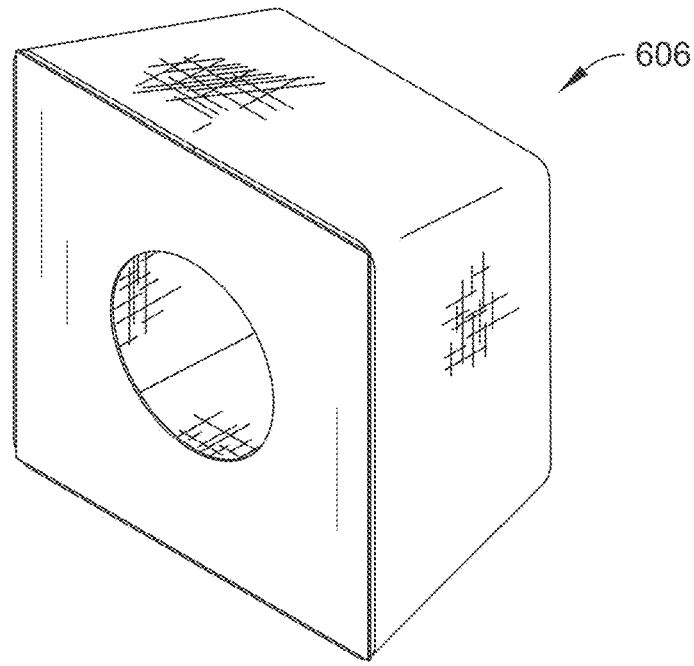
Figure 12A:
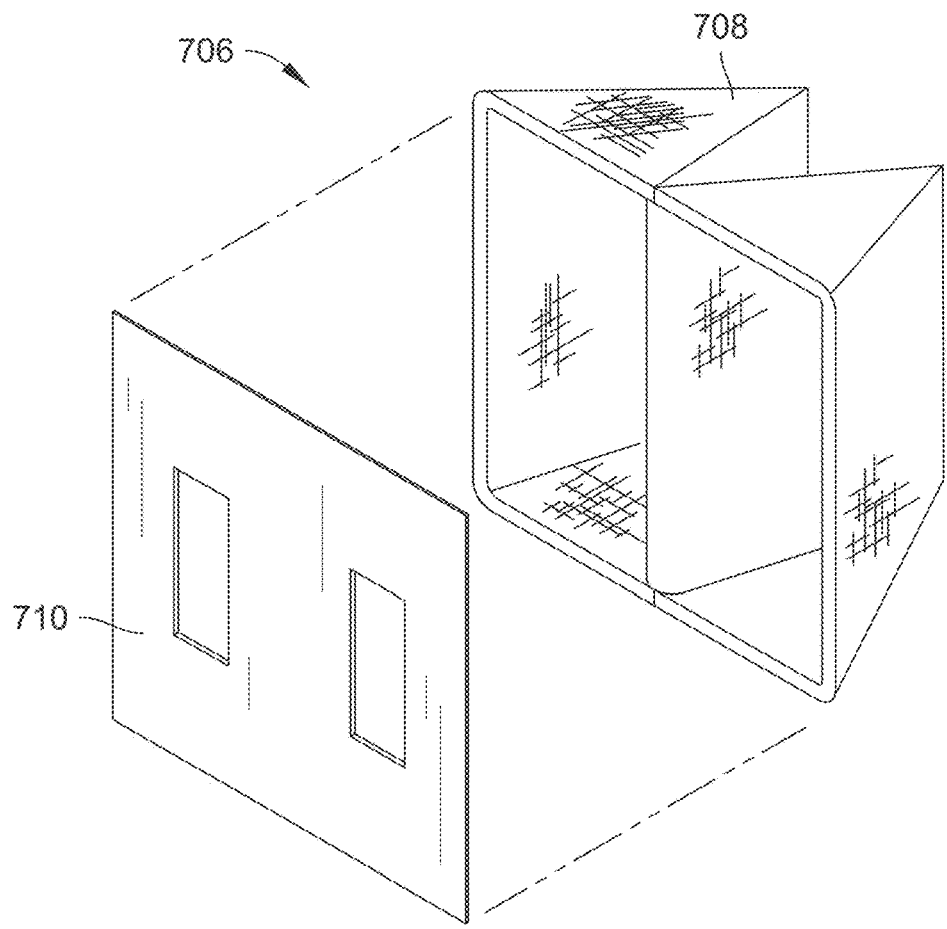
Figure 12B:
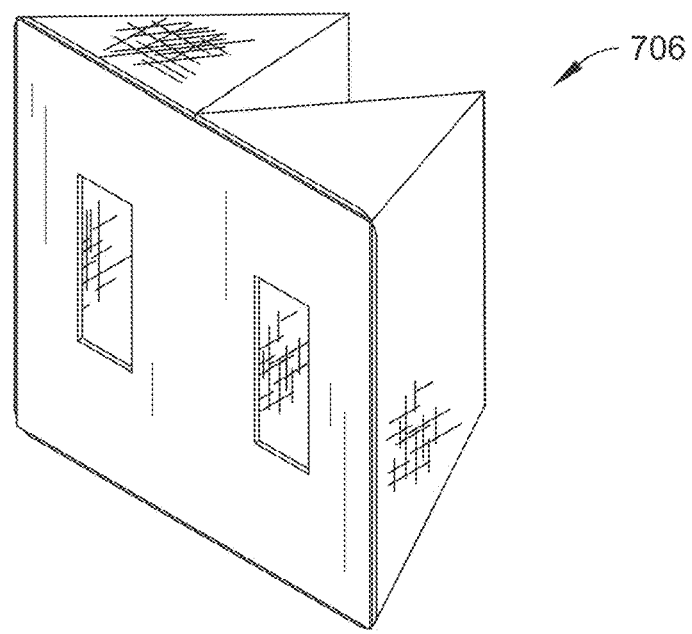
Figure 13A:
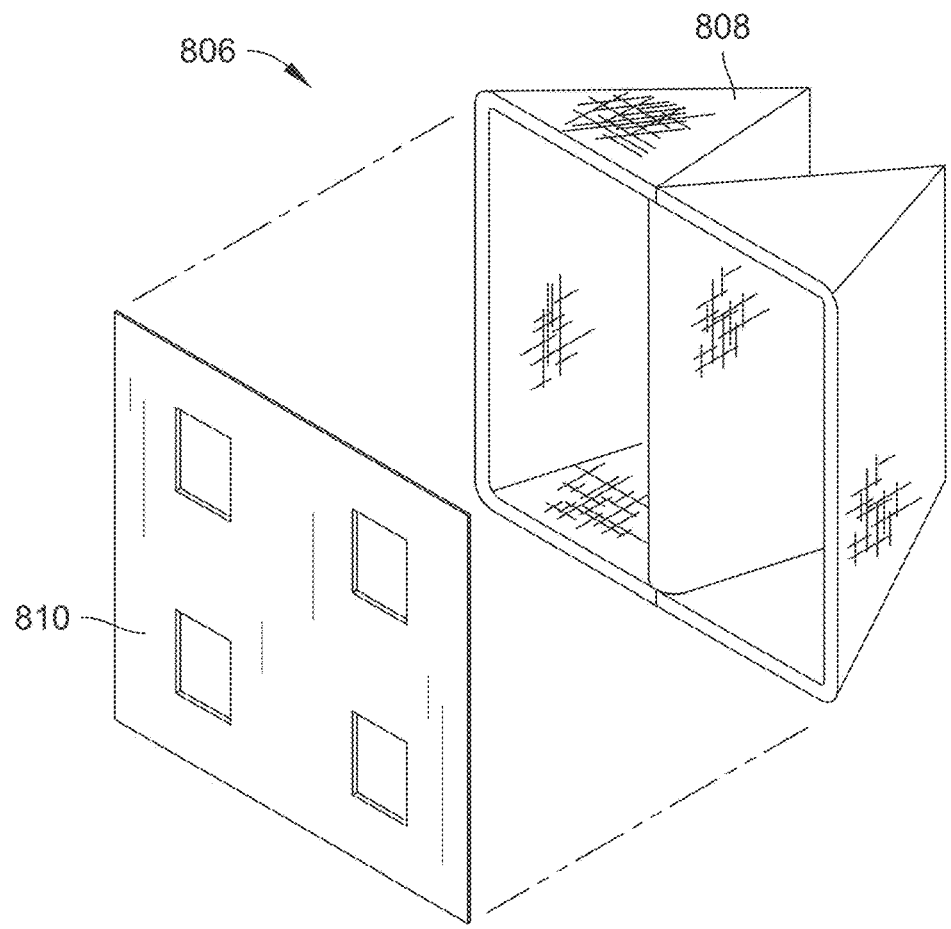
Figure 13B:
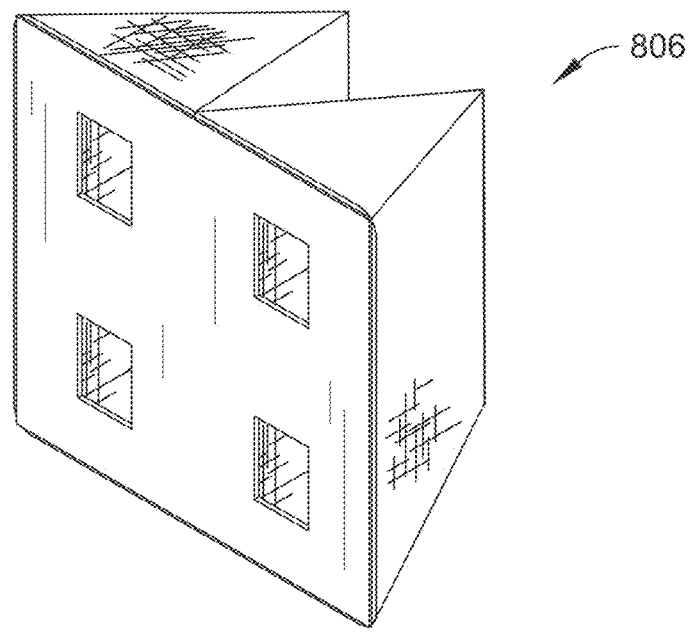

Many other filter unit arrangements are anticipated, such as, for example, those illustrated in FIGS. 11A through 11C; 12A through 12D; and 13A through 13D. The filter unit 606 of the example embodiment of FIGS. 11A through 11C has a flat entry plate 610 (e.g., orifice plate) but has a generally cube-shaped pocket filter structure 608. The filter unit 706 of the example embodiment of FIGS. 12A through 12D has a double "V," two-pocket filter structure 708 and a corresponding double-orifice entry plate 710 (e.g., each rectangular orifice corresponding to a respective pocket). The filter unit 806 of the example embodiment of FIGS. 13A through 13D has a double "V," two-pocket filter structure 808 and a corresponding quad-orifice entry plate 810 (e.g., each pocket having two plate orifices corresponding thereto). Even when two orifices are available per fluid cavity, as per the illustrated example, it is desired that each orifice create a unique, constricted fluid stream carrying particulate that impinges upon the filter structure walls, at a corresponding unique impaction zone, before the constricted flow stream can expand to full size.

The filter unit 906 of the example embodiment of FIGS. 14A through 14D can include a filter structure 908 and a bell-shaped entry plate 910. As best seen from FIG. 14D, the bell-shaped entry plate 910 can include a concavely-curved guide portion 911A and an orifice extension portion 911B, with the extended portion 911B distally defining a plate orifice 912 (e.g., at a location opposite the concavely-curved guide portion 911A). The concavely-curved (i.e., inwardly-curved) guide portion 911A can promote a smooth fluid flow toward the extended portion 911B. The orifice extension portion 911B, in turn, can promote a laminar fluid flow prior to entry of the fluid through the plate orifice 912 and can help direct the fluid flow toward a desired impaction zone of the filter structure 908. The smooth-approach bell shape may provide for a lower pressure drop across the entry plate. Additionally, the plate orifice 912 may be positioned further into the interior of the fluid cavity C (e.g. for even larger and/or deeper filter structure 908) by way of orifice extension portion 911B. It is to be understood that, in some embodiments of the bell-shaped entry plate 910, an orifice extension portion 911B may not be included, with the plate orifice 912 being, instead, defined by the concavely-curved guide portion 911A (not shown). Likewise, it is to be understood that the use of an orifice extension portion 911B can be employed in other embodiments of the filter unit.

Figure 15A:
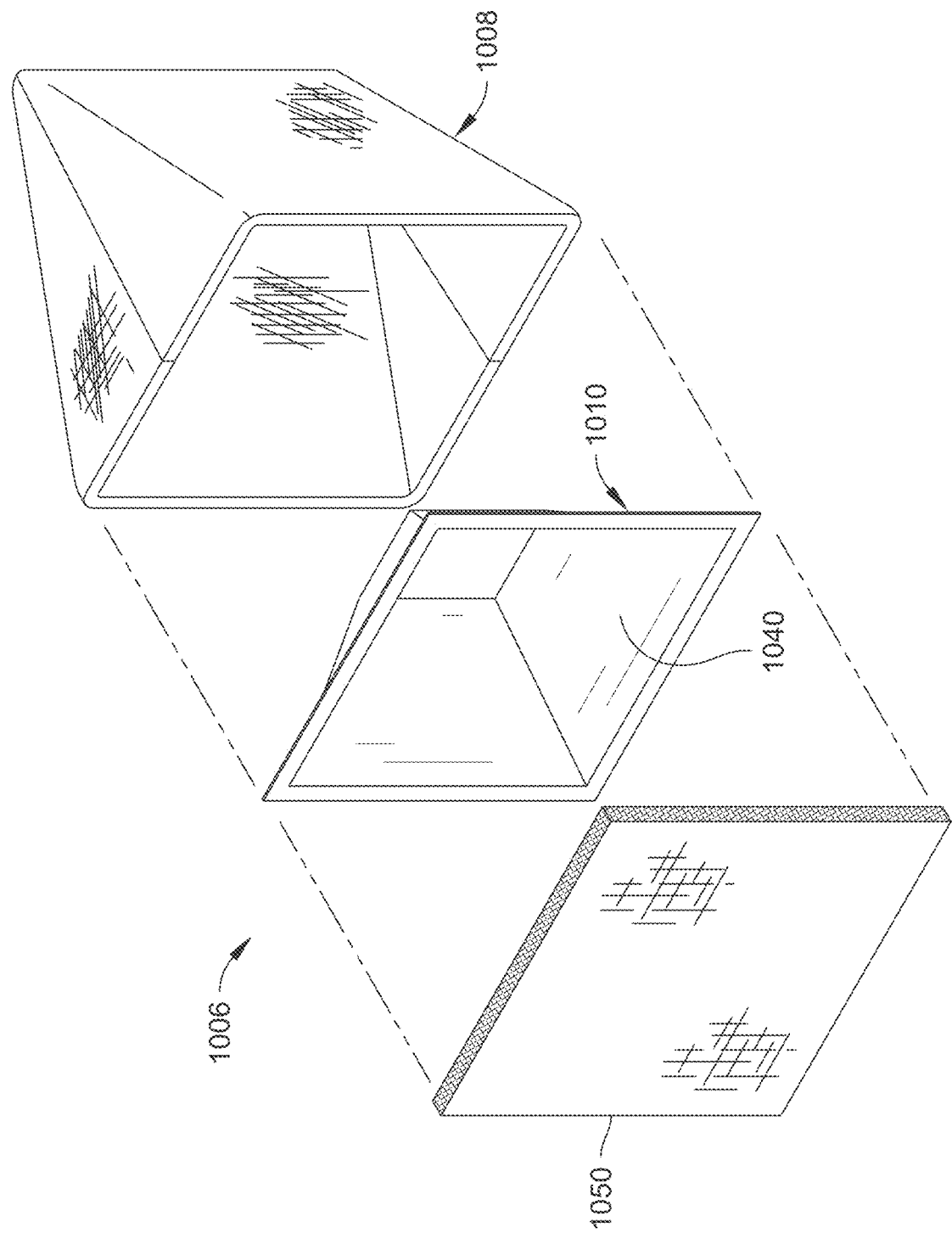
FIGS. 15A through 15C are a series of views (exploded isometric; assembled isometric; sectional view in a fluid stream) of a two-stage filter system, incorporating an angled-face entry plate, in accordance with an example embodiment of the present disclosure.
Figure 15B:
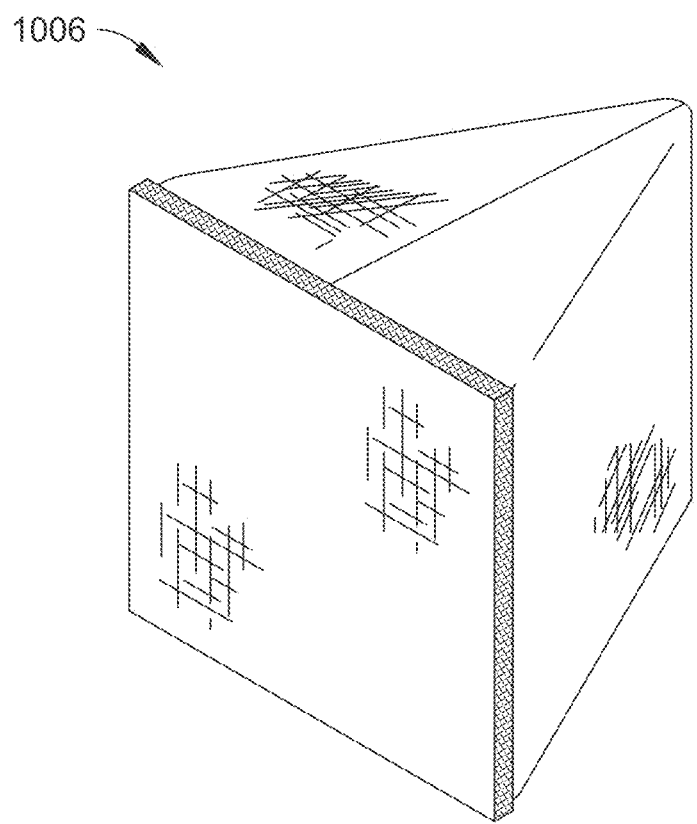
Figure 15C:
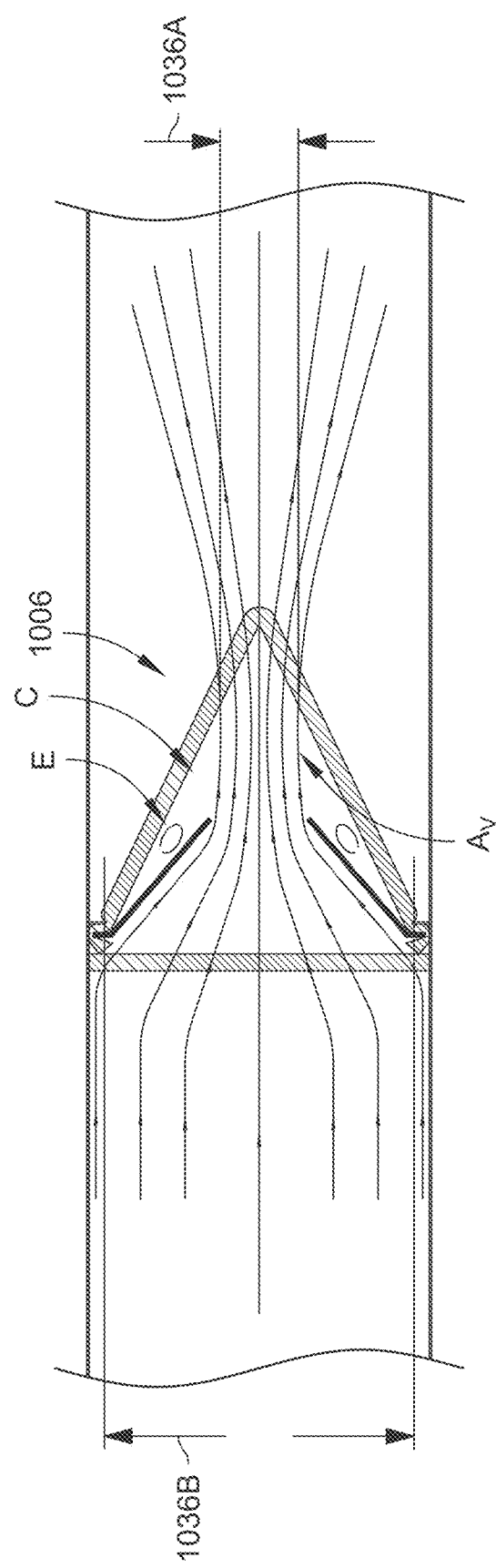

FIGS. 15A through 15C together illustrate an example embodiment of a filter unit 1006 (commonly known as a two-stage filter unit when applied in the traditional sense) that is similar to the filter unit 406, except that the filter unit 1006 can also include a forward or primary (e.g., first-stage) filter structure 1050, in addition to the secondary or rear filter structure 1008 (e.g., second-stage) and the angled-faced entry plate 1010 positioned therebetween. The primary filter structure 1050 may be mounted across the entry or orifice plate 1010, such that any fluid flow (air or otherwise) can reach and thus pass through the primary filter 1050 prior to proceeding to the remainder of the filter unit 1006 (e.g., the orifice plate 1010 and the filter structure 1008). It is understood that, in embodiments, the primary filter structure 1050 can advantageously be used in conjunction with an angled-face embodiment of entry plate 1010 due to the void (i.e. gap/spacing) existing therebetween into which fluid (i.e. air) may enter, allowing the Venturi effect to occur after the fluid has passed through the entirety of primary filter structure 1050. In an alternate embodiment (not shown), which may be less advantageous, a close-proximity arrangement of the primary filter structure 1050 and a potential flat embodiment of entry plate 1010 may not create a sufficient void therebetween. An insufficient void may create a constricted flow $A_V$ at, in, or even before primary filter structure 1050. The substantially non-permeable (e.g., substantially non-porous) material of the entry plate 1010 can restrict fluid flow to only those portions of primary filter 1050 in direct alignment with the orifice of entry plate 1010, impeding substantially full use of the filtration potential of the primary filter 1050.

Figure 16:
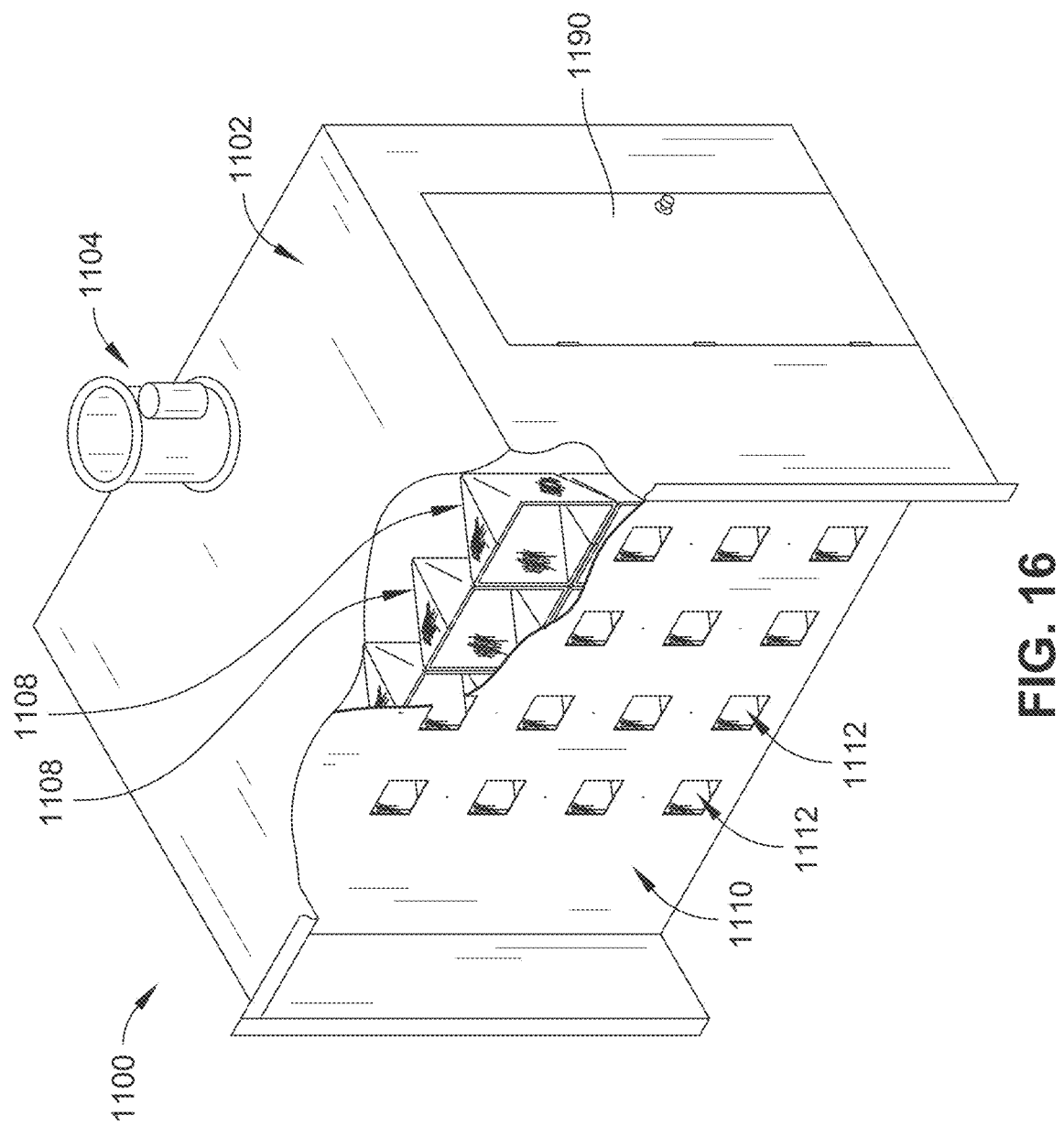
FIG. 16 is an isometric, partial cut-away view of a fluid flow system with a filtration system, similar to an industrial spray painting booth, with a single entry plate having multiple orifices, in accordance with an example embodiment of the present disclosure.

FIG. 16 illustrates an exhaust or filtrating fluid-flow system 1100 that can include an evacuation room/hood 1102, an exhaust or ventilation outlet 1104, a plurality of filter units 1106, and an evacuation room entry door 1190. The construction and operation of the filtrating fluid-flow system 1100 is similar to that of the filtrating fluid-flow system 100, except that there is a single-entry plate 1110 for use with the plurality of filter structures 1108. The entry plate 1110 has a plurality of plate orifices 1112, at least one plate orifice 1112 (e.g., nozzle orifice) corresponding to a given filter structure 1108. In an embodiment, the entry plate 1110 may be considered a permanent part of the filtrating fluid-flow system 1100, both in terms of its mounting (e.g., adhesive and/or mechanical fastening chosen to be more rigorous and not necessarily for easy-release) and/or its expected durability. In an embodiment, the entry plate 1110 may form a structural wall of the filtrating fluid-flow system 1100. In an embodiment, the filtrating fluid-flow systems 100 and 1100 may be designed, for example, as overhead systems or walk-in systems (e.g., with an entry door, e.g., 1190, to access the filter structures, as needed) and be within the scope of the present disclosure.

Figure 17A:
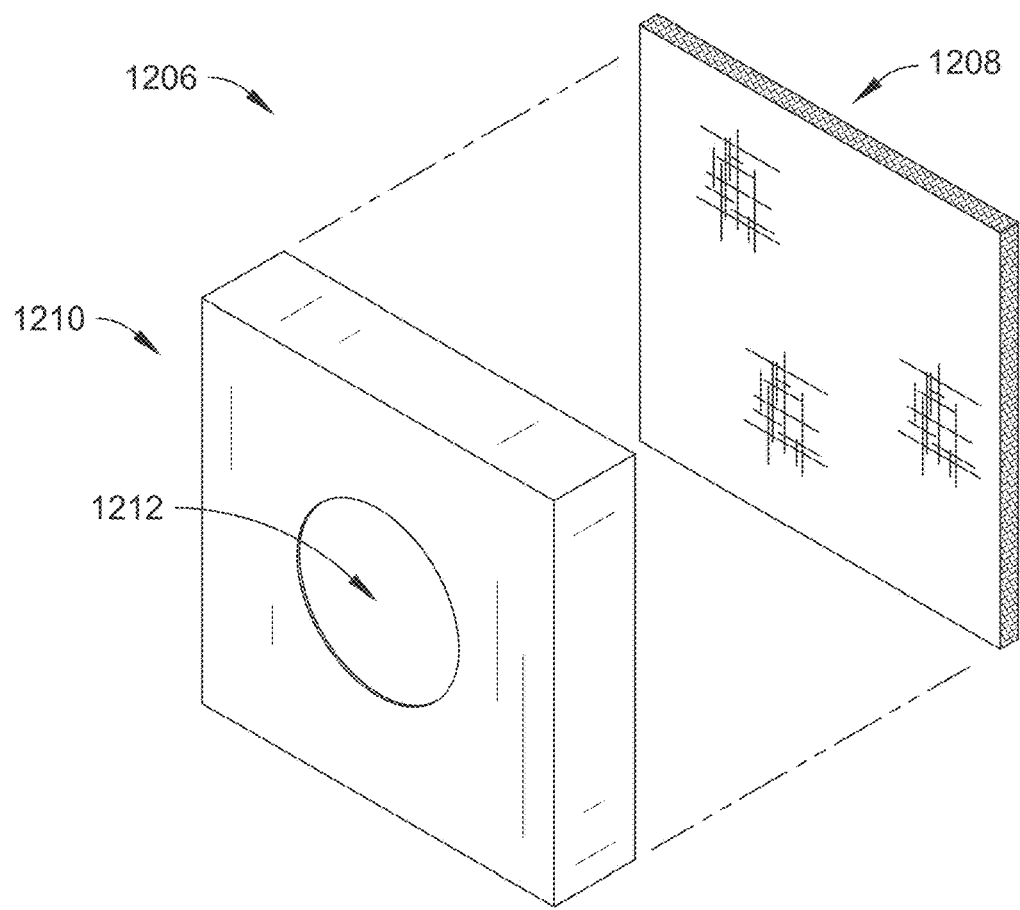
FIGS. 17A and 17B are a series of views (exploded isometric; assembled isometric) of a filter unit with a box-style entry plate and a flat filter structure, in accordance with an example embodiment of the present disclosure.
Figure 17B:
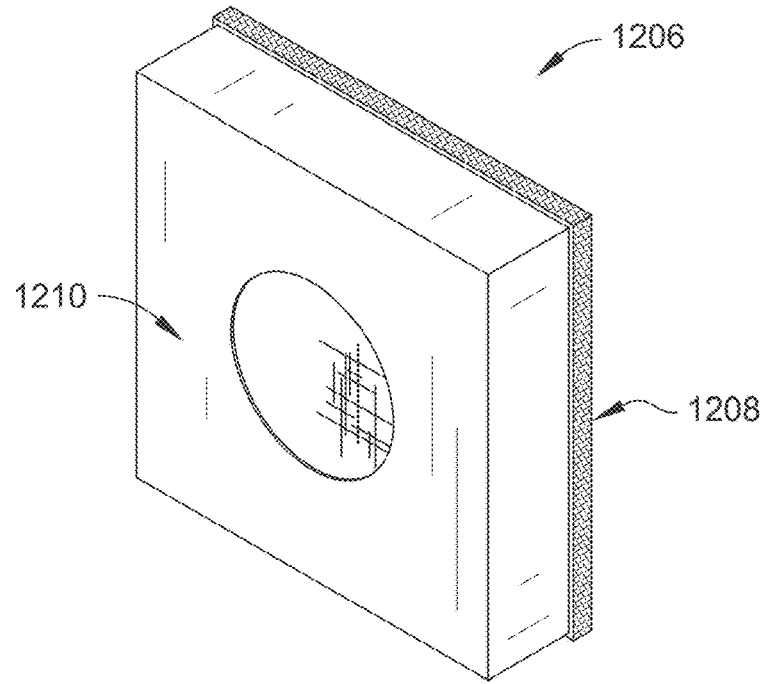

FIGS. 17A and 17B illustrates a filter unit 1206 in accordance with an example embodiment, the filter unit 1206 including a planar (e.g. flat) filter structure 1208 and a box-style entry plate 1210. Instead of the filter structure 1208 having a pocket and defining its own fluid cavity, the filter structure 1208 of this embodiment is a generally planar filter structure (e.g., any various pad/panel, with or without additional three-dimensional features built in). To provide an orifice arrangement and related fluid cavity for promoting a Venturi effect in accordance with the present disclosure, the orifice plate 1210 of this embodiment can be in the form of an open box (e.g., including four side panels, along with the main orifice panel). The entry plate 1210, like other variations thereof, can have an entry orifice 1212 defined therethrough to facilitate the accelerated (e.g., increased velocity) fluid stream to the filter structure 1208. In another embodiment (not shown) the planar filter structure 1208 may be installed in a filtrating fluid-flow system similar to that of filtrating fluid-flow system 1100 by providing a mounting means for planar filter structure 1208 downstream and apart from single entry plate 1110 such that a sufficient fluid cavity is created therebetween to promote a Venturi effect in accordance with the present disclosure.

Figure 18A:
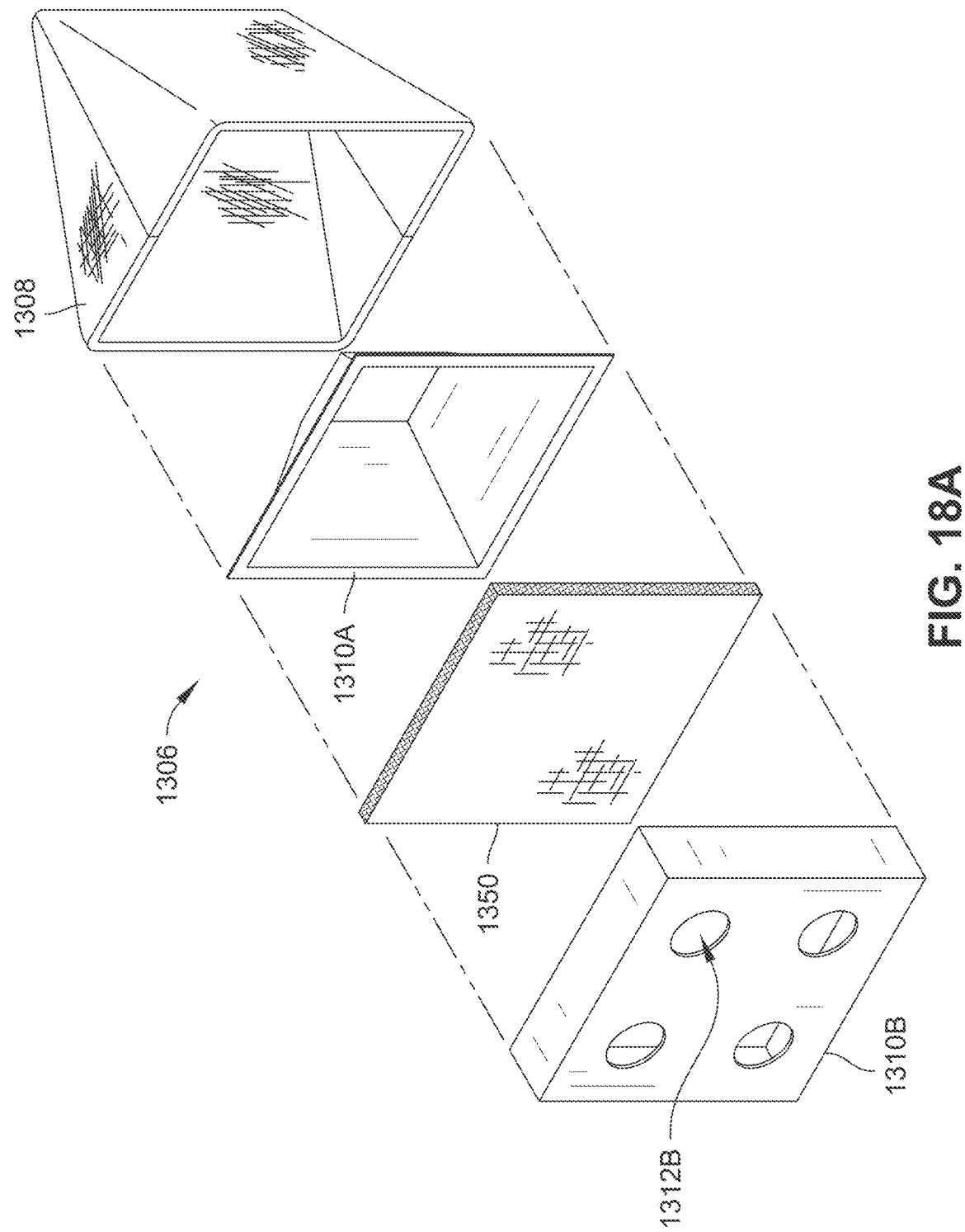
FIGS. 18A through 18C are a series of views (exploded isometric; assembled isometric; sectional view in a fluid stream) of a two-stage filter system, incorporating one angled-face entry plate and a second box-style entry plate, in accordance with an example embodiment of the present disclosure.
Figure 18B:
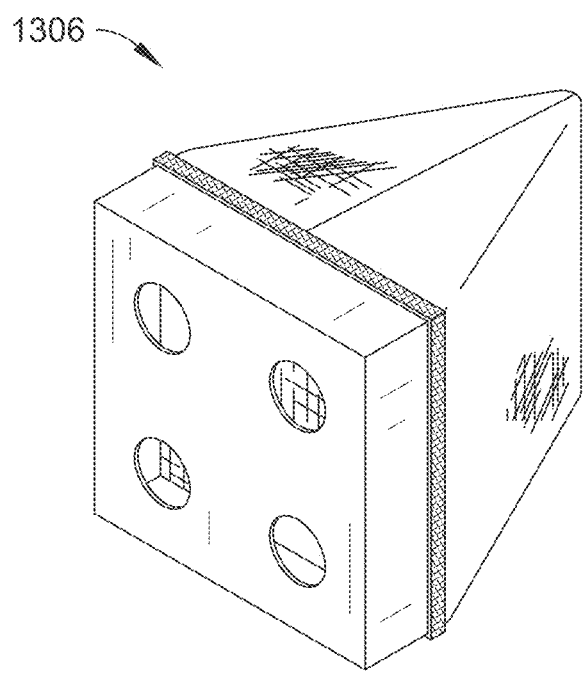
Figure 18C:
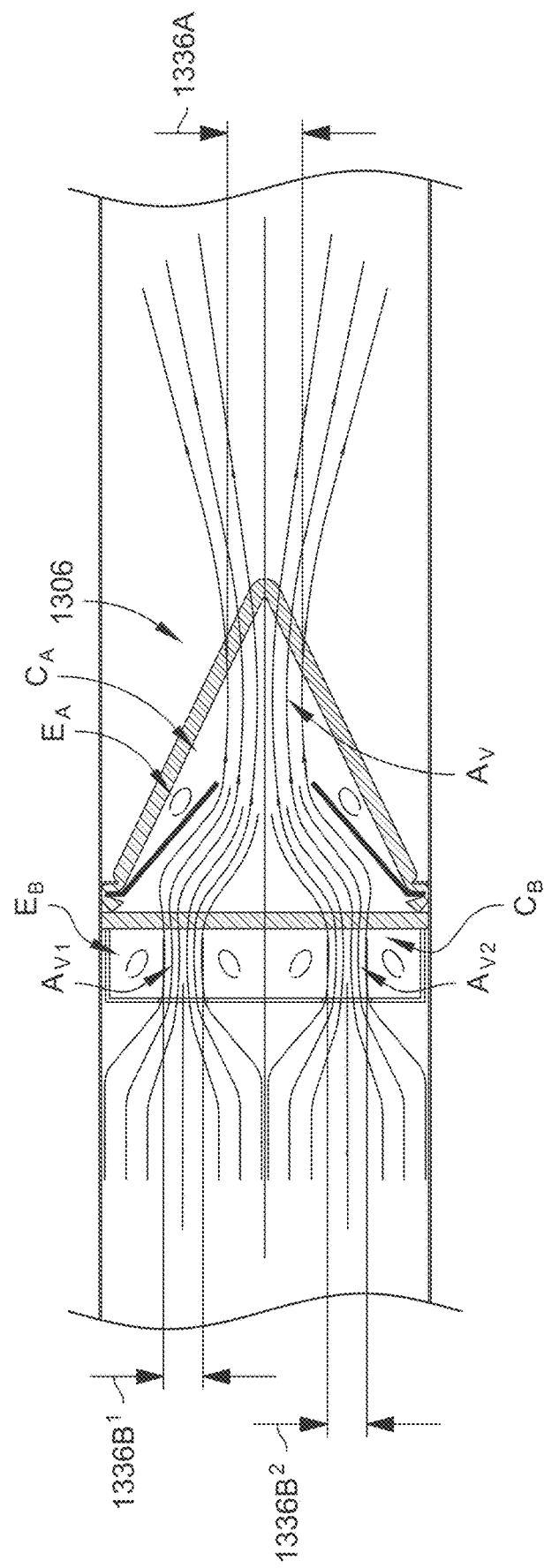
Figure 19A:
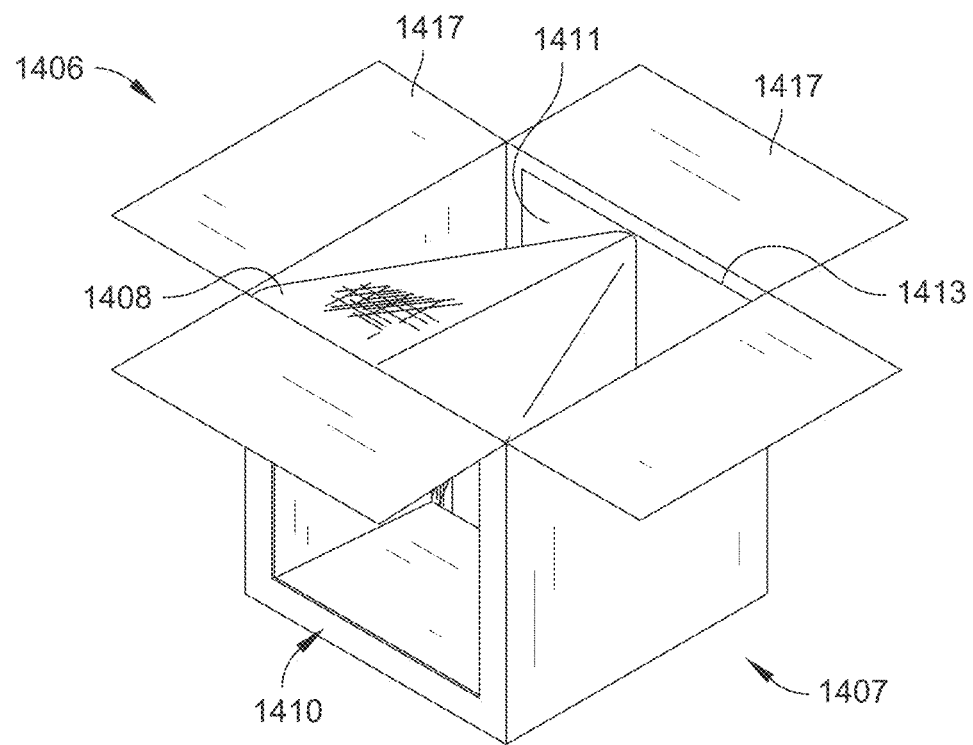
FIGS. 19A through 19D are a series of views (isometric with box top open; isometric with box top closed; front/inlet view; cross-section along 19D-19D of FIG. 19C) of a filter system employing a box that defines a single nozzle plate and a box exit.
Figure 19B:
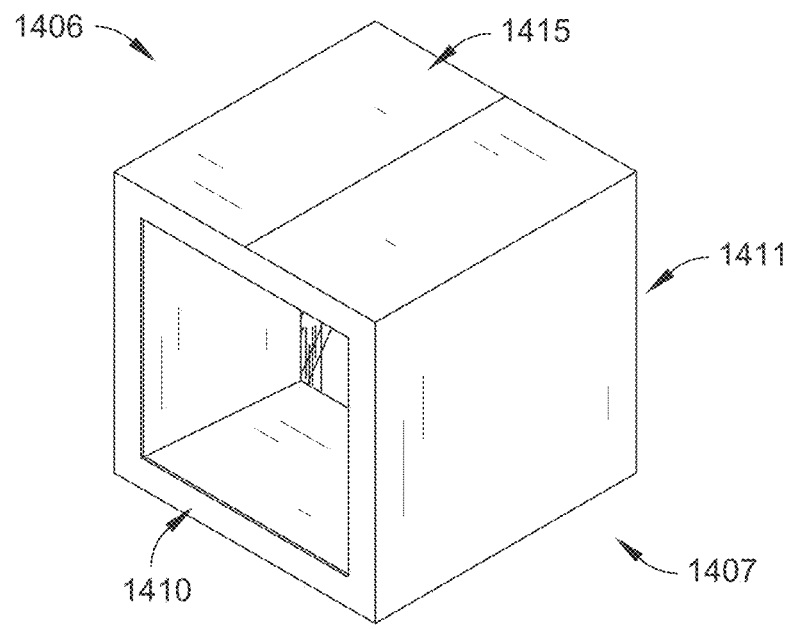
Figure 19D:
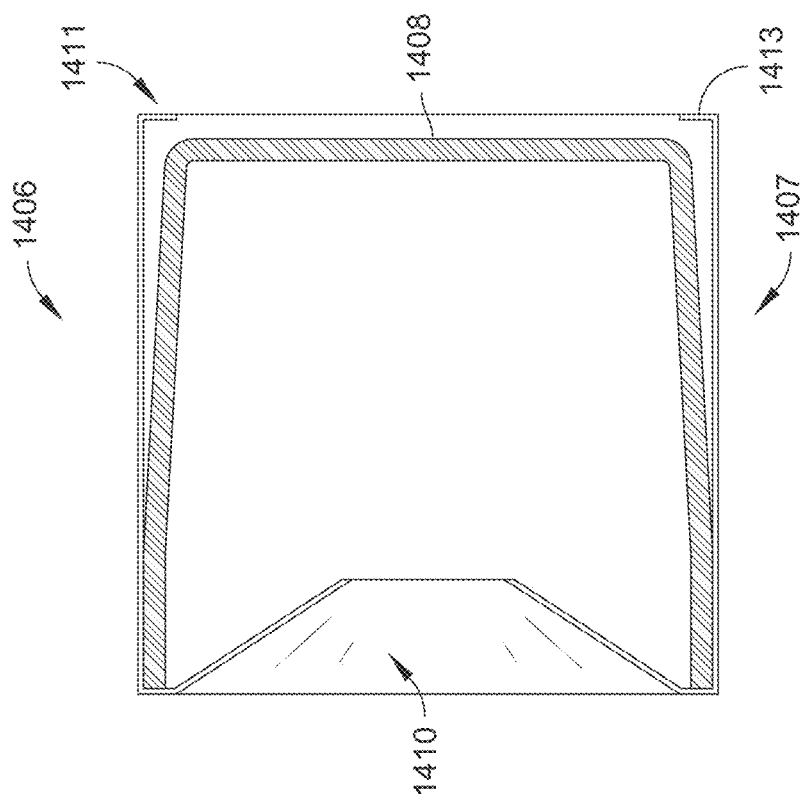
Figure 19C:
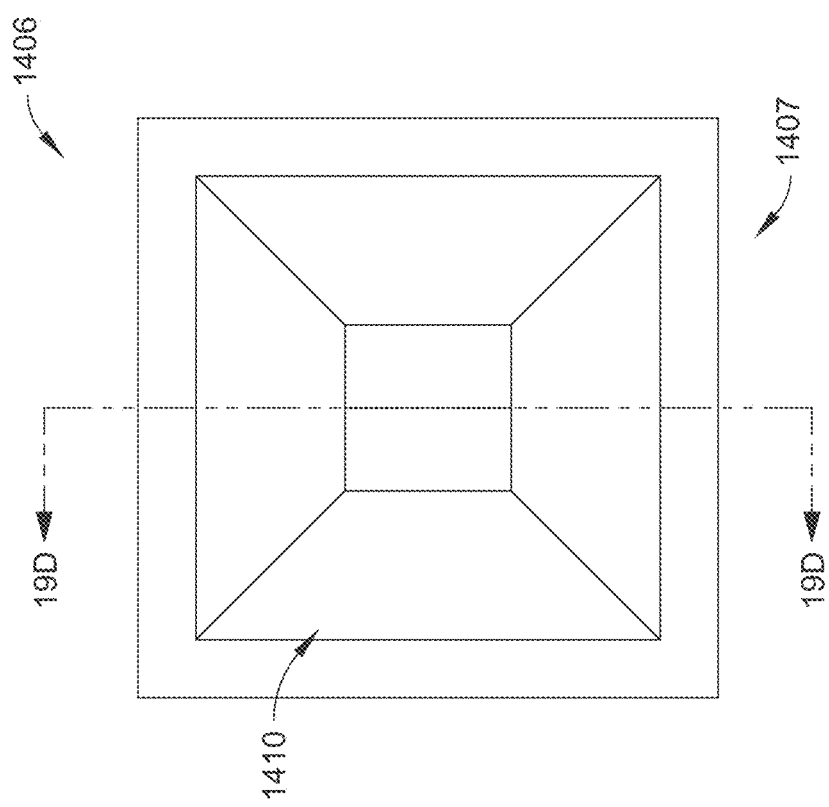
Figure 20A:
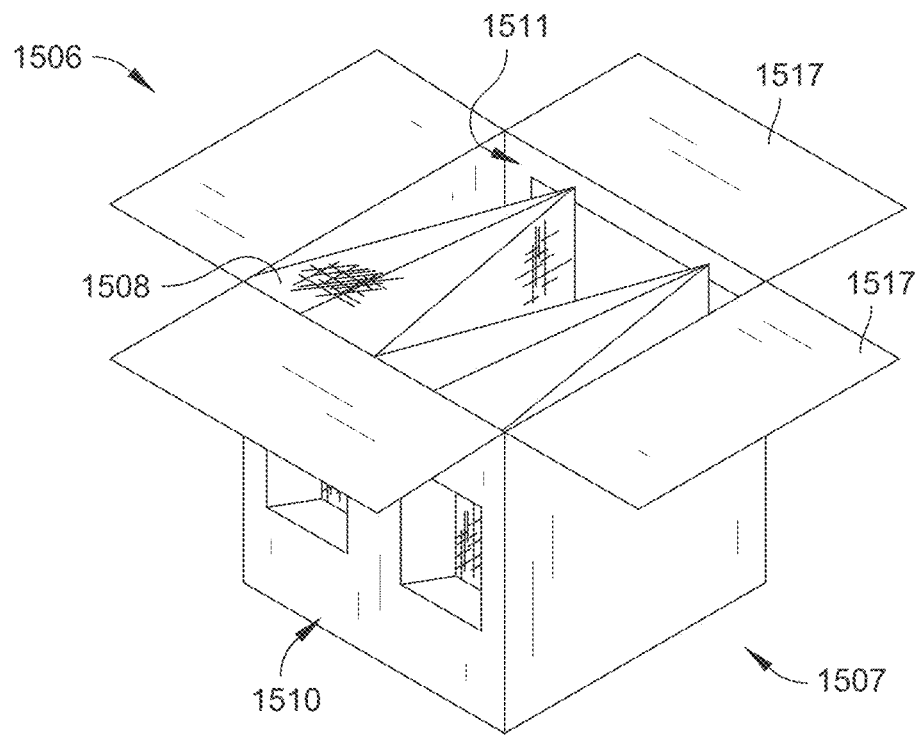
Figure 20B:
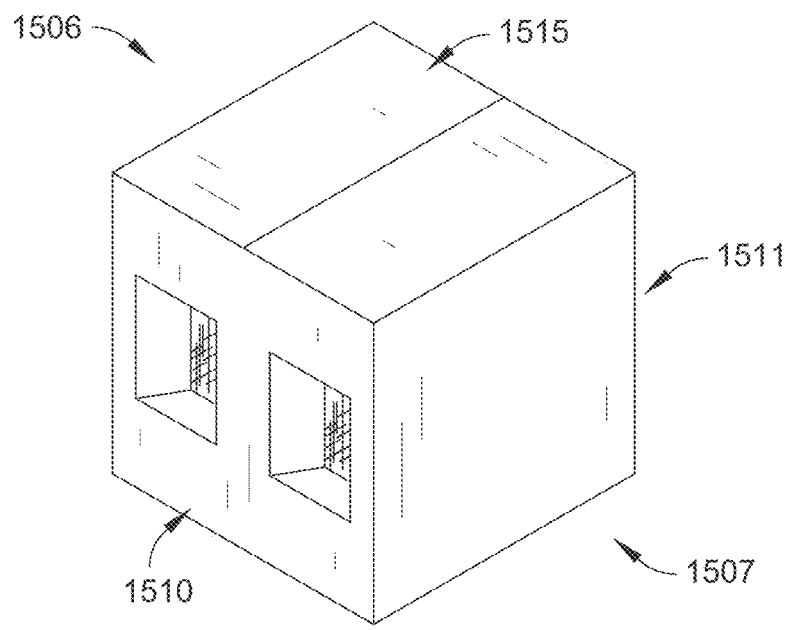

FIG. 18A through 18C together illustrate an example embodiment of a filter unit 1306 (also commonly known as a two-stage filter unit when applied in the traditional sense) that is similar to the filter unit 1006, except that the filter unit 1306 can also include an additional entry plate 1310B positioned upstream of the primary (e.g., first-stage) filter structure 1350, secondary filter structure 1308 (e.g., second-stage), and the angled-faced entry plate 1310A positioned between primary filter structure 1350 and secondary filter structure 1308. In an embodiment, wherein primary filter structure 1350 is a generally planar filter structure, an additional entry plate 1310B may be a box-style entry plate similar to entry plate 1210 previously shown in FIGS. 17A and 17B. In an embodiment, entry plate 1310B may have more than one plate orifice and may, for example, have four plate orifices 1312B as depicted in FIG. 18A. FIG. 18C is a cross-sectional view depicting two of the four plate orifices 1312B dividing external fluid flow $A_E$ into two of four constricted fluid flows $A_{V1}$ and $A_{V2}$ ($A_{V3}$ and $A_{V4}$ are not visible in this view). When plate orifices 1312B have the same shape and size, it is expected that constricted fluid flows $A_{V1}$, $A_{V2}$, $A_{V3}$, and $A_{V4}$ will have the same velocity $V_{V1}$ in each of the four resultant constricted flows and 25% of the total mass. The resultant momentum in these constricted fluid flows $A_{V1}$, $A_{V2}$, $A_{V3}$, and $A_{V4}$ may suggest a different distance from the entry plate 1310B to the primary filter structure 1350 when compared to an optional single plate orifice 1312B (not shown), which may result in a single constricted fluid flow $A_{V1}$. Different implementations can determine which options and which embodiments may be preferred.

FIGS. 19A through 19D are a series of views of a filter unit 1406 employing a box structure 1407 that defines a single angle-face nozzle entry plate 1410 and an opposed box exit 1411 and that is configured for receiving a filter structure 1408 (e.g., a V-shaped filter pocket) therein. The box exit 1411 may define a generally open (e.g., 75-90% of available space open for airflow therethrough) exit wall, leaving enough of an exit border 1413 to retain the filter unit 1406. The box structure 1407 (e.g., with six nominal sides) can further include a box top 1415 which may define a series of foldable flaps 1417. The foldable flaps 1417 can facilitate the insertion of the filter structure 1408 into the box structure 1407, while permitting the closure of the box structure 1407 (e.g., by being taped shut or otherwise held closed), upon inserting the filter structure 1408 thereinto. The box structure 1407 can provide additional support for the filter structure 1408 (e.g., helping to keep it aligned relative to the angle-face nozzle entry plate 1410 and the opposed box exit 1411, even under added weight of filtered material—i.e., less prone to sagging) and may facilitate storage and/or shipping of the filter unit 1406. While shown with an angle face nozzle, it is to be understood, that in some embodiments, the nozzle plate 1410 may incorporate a simple opening (e.g., a flat/two-dimensional nozzle or choke, as shown in other embodiments).

FIGS. 20A through 20F are a series of views of a filter unit 1506 employing a box structure 1507 that defines a dual angle-face nozzle entry plate 1510 and an opposed box exit 1511 and that is configured for receiving a double "V," two-pocket filter structure 1508 or, alternatively, a pair of single pocket filter structures (not shown) therein. The box exit 1511 may define a generally open (e.g., 75-90% of available space open for airflow therethrough) exit wall, leaving enough of an exit border 1513 to retain the filter unit 1506. The box structure 1507 can further include a box top 1515 which may define a series of foldable flaps 1517. The foldable flaps 1517 facilitate the insertion of the filter structure 1508 into the box structure 1507, while permitting the closure of the box structure 1507, upon inserting the filter structure 1508 thereinto. The box structure 1507 can provide additional support for the filter structure 1508 (e.g., helping to keep it aligned relative to the dual angle-face nozzle entry plate 1510 and the opposed box exit 1511, even under added weight of filtered material—i.e., less prone to sagging) and may facilitate storage and/or shipping of the filter unit 1506. While shown with a pair of angle face nozzles within the entry plate 1510, it is to be understood, that in some embodiments, the nozzle plate 1510 may incorporate a set of simple openings (e.g., flat/two-dimensional nozzle) and/or may include more than two nozzle openings, as suggested by other embodiments.

Figure 21:
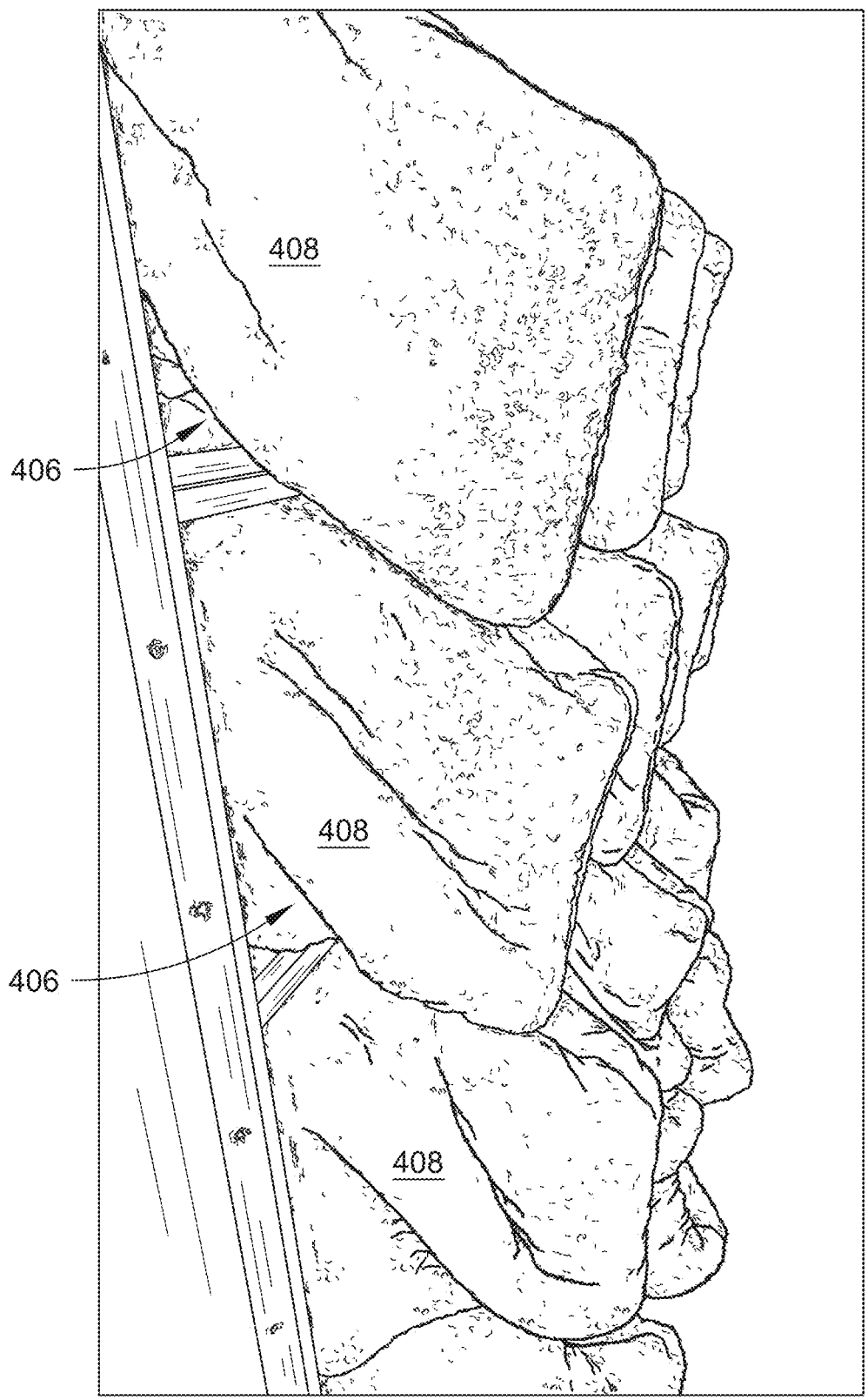
FIG. 21 is a view of a matrix of filter bags, each employing a nozzle plate in accordance with an embodiment of the present disclosure, after a period of use, in which the filter bags have begun to sag to the additional weight of the filtered material trapped within the corresponding filter bags.

FIG. 21 is a view of a matrix of filter bags (such as filter structures 408), each being part of a filter unit 406 in accordance with an embodiment of the present disclosure, after a period of use, in which the filter bags have begun to sag to the additional weight of the filtered material trapped therein. Such sagging can be problematic as it may partially or even fully shut down the nozzle opening of its associated entry plate 410. While shown with respect to a series of filter units 406, it is to be understood that other variants of the filter unit can have a similar problem with sagging after a period of use.

Figure 22A:
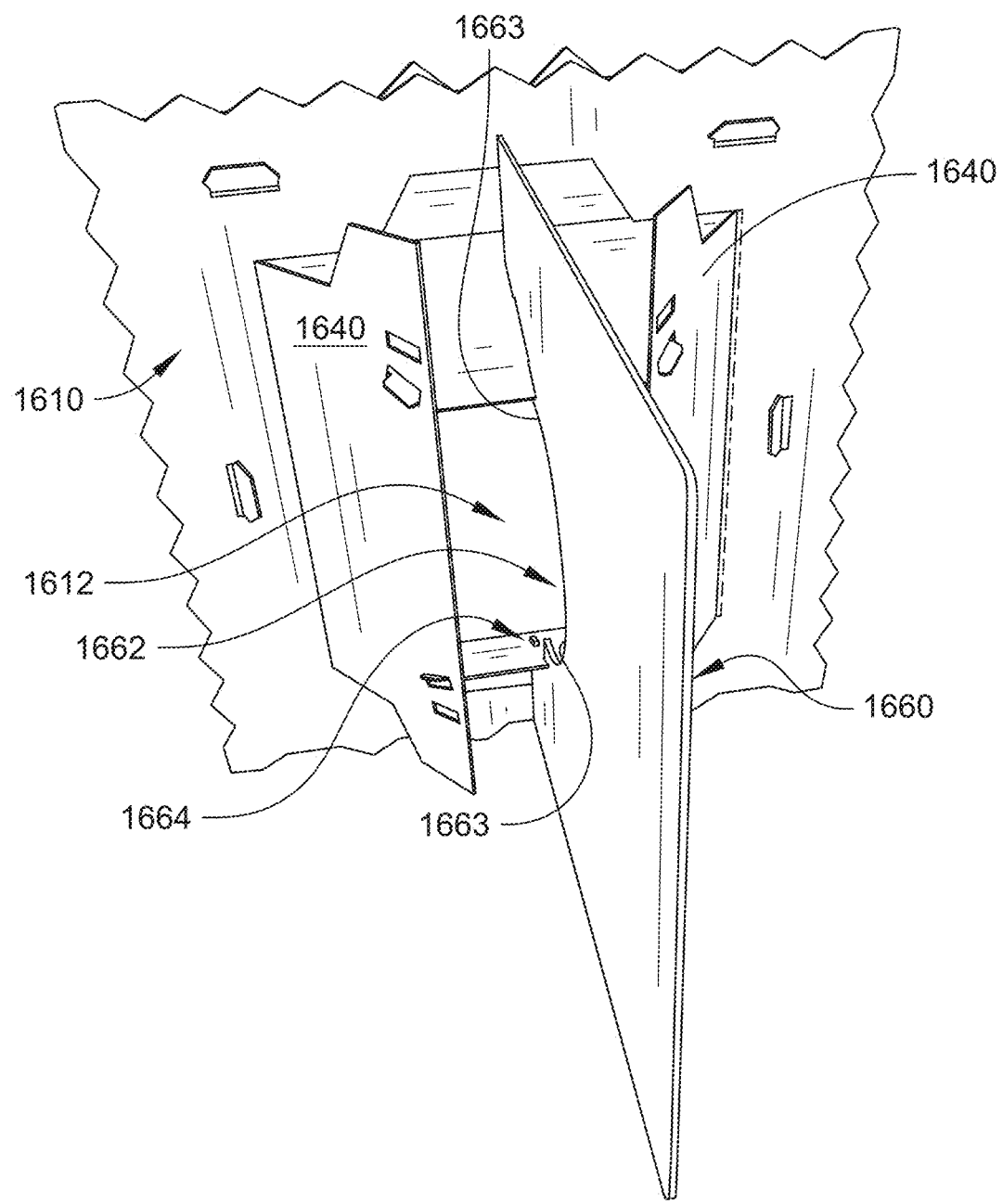
FIGS. 22A through 22C are a series of views (isometric rear; isometric side; isometric off-set front) of an entry plate with angled faces and operably-removable brace for supporting a filter bag, in accordance with an embodiment of the present disclosure.
Figure 22B:
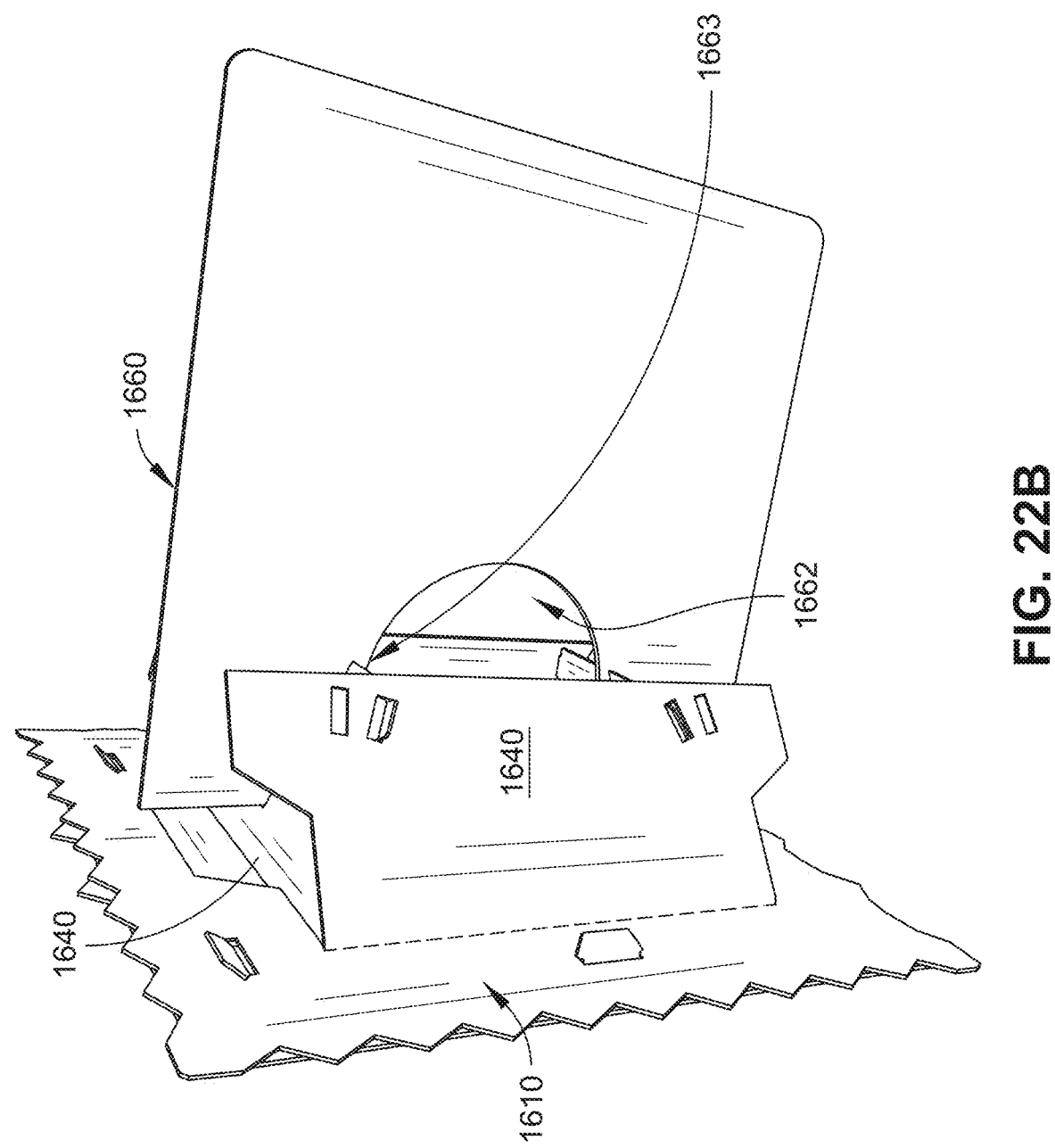
Figure 22C:
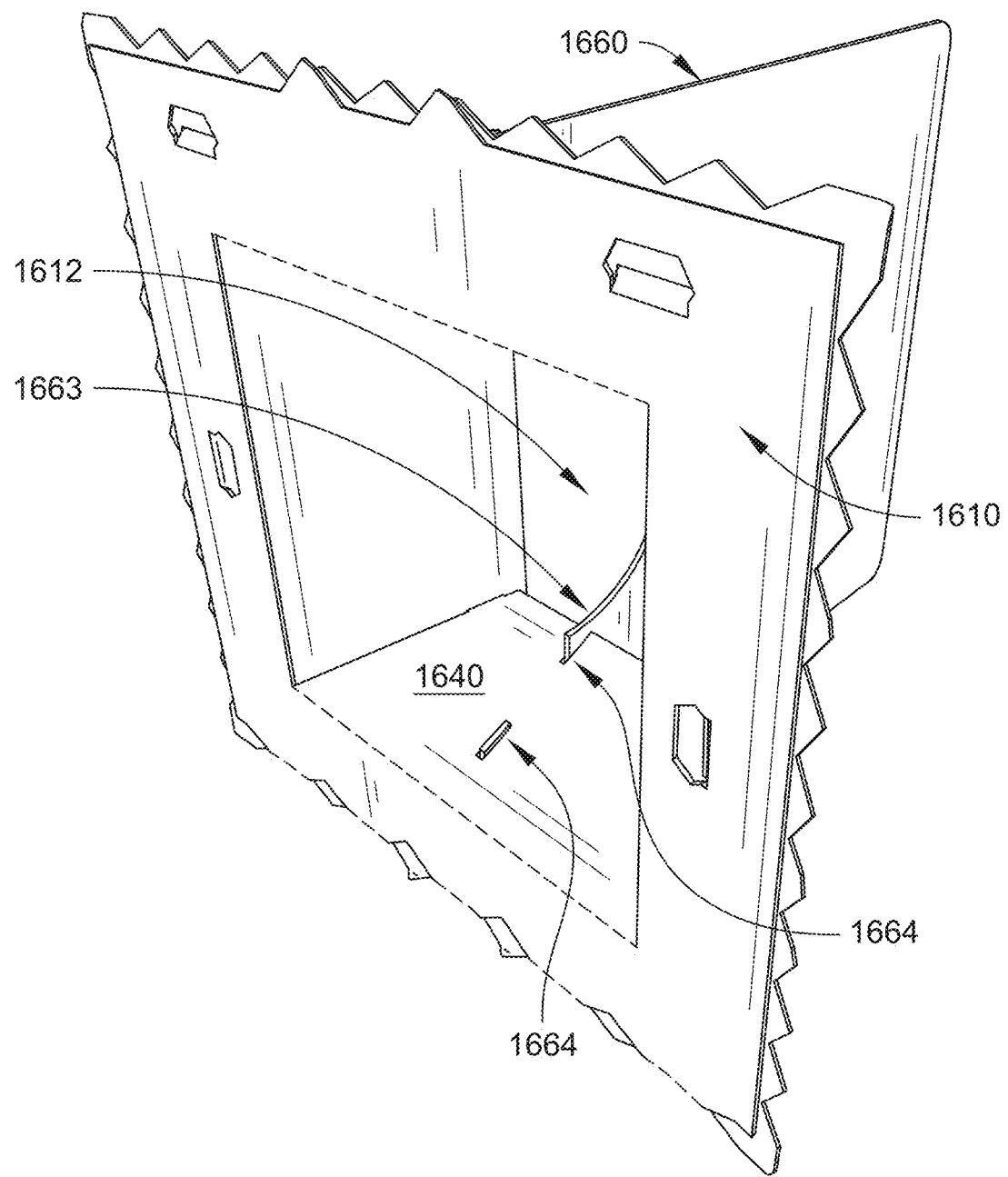

FIGS. 22A-22C are a series of view of a filter unit 1606 with an entry plate 1610 including a plurality of angled faces 1640 that define a plate orifice 1612 (e.g., nozzle exit), with a brace 1660 extending rearwardly away from the entry plate 1610 and its angled faces 1640 (e.g., the angled faces 1640 collectively defining a nozzle of the entry plate 1610). The brace 1660 can help support a corresponding filter bag (as shown in other embodiments) and help keep such a filter bag from sagging due to the weight of filtered material trapped thereby, thus helping address the problem illustrated in FIG. 21. In an embodiment, the brace 1660 can particularly contact and support at least a portion of the upper side face (as determined by gravitational direction) of a corresponding filter bag. In an embodiment, the brace 1660 extends into the upper corner of the filter bag (e.g., junction of the upper side face and the apex thereof). In an embodiment, more than one brace 1660 can be used (e.g., parallel to one another or in a cross configuration), thereby providing further support. The use of more than one brace 1660 may be beneficial when, for example, the filter bag approximates a trapezoidal prism or a rectangular prism.

In an embodiment, the brace 1660 can define a central edge opening 1662 (e.g., a cut-out or pre-form) to accommodate attachment thereof to a pair of angled faces 1640. The central edge opening 1662 may, for example, be in the form of an arc, a parabola, or a rectangular shape. The brace 1660 can be attached to the pair of angled faces 1640 via one or more tab/slot combinations 1664 together defined by the pair of angled faces 1640 and at opposed opening portions 1663 of the central edge opening 1662 of the brace 1660 (with the tab associated with one of the angled faces 1640 or the central edge opening 1662 and the slot being associated with the other opposed member), as shown, and/or attached mechanically (e.g., via a clip) or via an adhesive, or by a combination of such mechanisms. In an embodiment, the entry plate 1610 defines at least a pair of opposed acutely angled faces 1640, and the set of opposed opening portions of the central edge opening 1662 respectively connect with a pair of opposed acutely angled faces 1640. In an embodiment, the pair of opposed acutely angled faces 1640 and the brace 1660 together defining an opposed set of mating slot and tab combinations 1664. The central edge opening 1662 may help promote better long-term exhaust particle flow from the plate orifice 1612 by eliminating a local surface portion of the brace 1660 upon which paint or other particulates could otherwise accumulate upon.

In an embodiment, the brace 1660 can extend generally orthogonally to the entry plate 1610. In an embodiment, the brace 1660 may connect with the entry plate 1610 at one or more locations that are may or may not be part of an exit nozzle (e.g., acutely angled faces 1640). In an embodiment, the brace 1660 can supportively engage a corresponding filter bag (e.g., at an upper side, relative to vertical, where vertical is established by gravity). In an embodiment, the brace 1660 may further engage with at least a portion of the apex of the filter bag, helping to keep the filter bag stretched out and open, upon collection of particulates therein. In an embodiment, the brace 1660 can be made of cardboard, plastic, or another structural material capable of supporting and maintaining the desired shape and position of the corresponding filter bag. In some embodiments, the entirety of the filter unit 1606 (e.g., the filter structure, entry plate, and brace) is made of components that can be disposed of via incineration (thereby simplifying disposal). In an embodiment, the brace 1660 may attach to the flat portion of the entry plate 1610, particularly if no angled faces 1640 are available with which to attach.

In an embodiment, the brace 1660 may be a thin (e.g., 0.25 in thick or less) plate member. In an embodiment, the brace 1660 can be a substantially rectangular (e.g., less the central edge opening 1662) support member. In an embodiment, the brace 1660 may be approximately triangular (not shown) with the upper edge thereof positioned and configured to support an upper side of a filter bag, with the other right leg engaging two opposed angled faces 1640 (e.g., via a central edge opening 1662). Other shapes (e.g., I-shaped) for the brace 1660 may be possible that provide a connection with the entry plate 1610 and sufficiently support the filter bag, and such shapes are considered to be within the scope of the present disclosure. A thin plate construction for any shaped brace 1660 can be beneficial as it can minimize interruption of the desired flow out of the entry plate 1610 and toward an accompanying filter bag. In an embodiment, the brace 1660 and the apex of the corresponding filter bag may be oriented vertically relative to the ground or another ultimate support surface to minimize the opportunity for bending of the brace 1660 due to the effect of gravity (e.g., vertical pull on the bag as it becomes heavier during use). It is to be understood that the use of a given brace 1660 can optionally be incorporated with any various filter plate and/or filter unit embodiment presented herein, in order to support a corresponding filter bag and help prevent sagging thereof.

It is to be understood that the present application is defined by the appended claims. Although embodiments of the present application have been illustrated and described herein, it is apparent that various modifications may be made by those skilled in the art without departing from the scope and spirit of this disclosure.

What is claimed is:

1. A filter unit for use with a filtrating fluid flow system, the filter unit configured to receive a flow of a fluid containing particulate matter, the filter unit defining a fluid flow zone, the filter unit including a fluid entrance for the fluid at a first end of the fluid flow zone, the filter unit comprising:
    a filter structure comprising a fluid-permeable filter material configured to at least partially filter the particulate matter from the flow of fluid;
    an entry plate comprising a generally nonporous material, the entry plate located proximate the filter unit entrance and mounted upstream relative to the filter structure, the entry plate and the filter structure together defining a fluid cavity within the filter unit, the entry plate having at least one orifice defined therein through which the flow of fluid can pass into the fluid cavity; and
    a brace extending rearwardly from the entry plate, the brace contacting and supporting at least a portion of the filter structure, the brace defining an edge dividing the at least one orifice to permit contact between the flow of fluid and the edge of the brace in the fluid cavity, the edge formed by opposing sides of the brace, each of the opposing sides is open to respective divided portions of the fluid cavity and configured to interact with the flow of fluid subsequent to contact between the edge and the flow of fluid.

2. The filter unit as recited in claim 1, wherein the filter structure defines an upper side face with respect to a gravitational direction, the brace configured to contact and support at least a portion of the upper side face of the filter structure.

3. The filter unit as recited in claim 2, wherein the filter structure further defines an apex, the filter structure defining an upper corner where the upper side face and the apex meet, the brace extending to the upper corner of the filter structure.

4. The filter unit as recited in claim 1, wherein the entry plate comprises one or more acutely angled faces terminating at the at least one plate orifice, the acutely angled faces sloping inwardly into the fluid cavity of the filter unit, at least one acutely angled face connected to the brace.

5. The filter unit as recited in claim 4, wherein at least one acutely angled face of the entry plate and the brace together define at least one mating slot and tab combination therebetween configured to facilitate attachment of the brace to the entry plate.

6. The filter unit as recited in claim 5, wherein the entry plate defines a pair of opposed acutely angled faces, the pair of opposed acutely angled faces and the brace together defining an opposed set of mating slot and tab combinations.

7. The filter unit as recited in claim 1, wherein the edge of the brace defines a central edge opening, the central edge opening defining opposed opening portions, the entry plate defining at least a pair of opposed acutely angled faces, the opposed opening portions and the opposed acutely angled faces respectively connected to one another.

8. A filtration system for use with a fluid flow system, the filtration system configured to receive a flow of a fluid containing particulate matter, the filtration system defining a fluid flow zone, the filtration system having an entrance at a first end thereof, the filtration system comprising:
 an operably removeable filter structure comprising a fluid permeable filter material configured to at least partially filter the particulate matter from the flow of fluid;
 an entry plate comprising a generally nonporous material located proximate to the filter structure entrance and mounted upstream relative to the filter structure, the entry plate and the filter structure together defining a fluid cavity within the filtration system, the entry plate having at least one orifice defined therein through which the flow of fluid can pass into the fluid cavity; and
 a brace extending rearwardly from the entry plate, the brace contacting and supporting at least a portion of the filter structure, the brace defining an edge dividing the at least one orifice to permit contact between the flow of fluid and the edge of the brace in the fluid cavity, the edge formed by opposing sides of the brace, each of the opposing sides is open to respective divided portions of the fluid cavity and configured to interact with the flow of fluid subsequent to contact between the edge and the flow of fluid.

9. The filtration system as recited in claim 8, wherein the entry plate comprises one or more acutely angled faces terminating at the at least one plate orifice, the acutely angled faces sloping inwardly into the fluid cavity of the filter unit, at least one acutely angled face connected to the brace.

10. The filtration system as recited in claim 8, wherein the filter structure defines an upper side face with respect to a gravitational direction, the brace configured to contact and support at least a portion of the upper side face of the filter structure.

11. The filtration system as recited in claim 10, wherein the filter structure further defines an apex, the filter structure defining an upper corner where the upper side face and the apex meet, the brace extending to the upper corner of the filter structure.

12. The filtration system as recited in claim 8, wherein the edge of the brace defines a central edge opening, the central edge opening defining opposed opening portions, the entry plate defining at least a pair of opposed acutely angled faces, the opposed opening portions and the opposed acutely angled faces respectively connected to one another.

13. The filtration system as recited in claim 8, wherein the brace is a thin plate construction.

14. The filtration system as recited in claim 8, wherein the entirety of the filtration system is capable of disposal via incineration.

15. An entry plate-brace assembly for a filter unit, the filter unit at least partially comprising a fluid permeable filter material, the entry plate-brace assembly comprising:
 a plate portion of generally nonporous material, the entry plate configured to be positioned proximate a fluid entrance of the filter unit, the entry plate and the filter material together configured to define a fluid cavity within the filter unit, the entry plate having at least one orifice defined therein through which the flow of fluid can pass into the fluid cavity; and
 a brace extending rearwardly from the entry plate, the brace configured to contact and support at least a portion of the filter material, the brace defining an edge dividing the at least one orifice to permit contact between the flow of fluid and the edge of the brace in the fluid cavity, the edge formed by opposing sides of the brace, each of the opposing sides is open to respective divided portions of the fluid cavity and configured to interact with the flow of fluid subsequent to contact between the edge and the flow of fluid.

16. The entry plate-brace assembly as recited in claim 15, wherein the entry plate comprises one or more angled faces terminating at the at least one plate orifice, the angled faces configured to slope inwardly into the fluid cavity of the filter unit, at least one acutely angled face connected to the brace.

17. The entry plate-brace assembly as recited in claim 15, wherein the filter structure defines an upper side face with respect to a gravitational direction, the brace configured to contact and support at least a portion of the upper side face of the filter structure.

18. The entry plate-brace assembly as recited in claim 15, wherein the edge of the brace defines a central edge opening, the central edge opening defining opposed opening portions, the entry plate defining at least a pair of opposed acutely angled faces, the opposed opening portions and the opposed acutely angled faces respectively connected to one another.

19. The entry plate for a filter unit as recited in claim 15, wherein the brace is a thin plate construction.

20. The filter unit as recited in claim 1, wherein the brace is positioned within the filter structure to allow the flow of fluid around the brace.

* * * * *